US012719633B2

(12) United States Patent
Baek et al.

(10) Patent No.: US 12,719,633 B2
(45) Date of Patent: Aug. 25, 2026

(54) METHOD BY WHICH TERMINAL TRANSMITS AND RECEIVES SIGNALS RELATED TO POSITIONING IN WIRELESS COMMUNICATION SYSTEM SUPPORTING SIDELINK, AND DEVICE THEREFOR

(71) Applicant: LG ELECTRONICS INC., Seoul (KR)

(72) Inventors: Jongseob Baek, Seoul (KR); Woosuk Ko, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 546 days.

(21) Appl. No.: 18/269,525

(22) PCT Filed: Jul. 1, 2021

(86) PCT No.: PCT/KR2021/008322

§ 371 (c)(1),
(2) Date: Jun. 23, 2023

(87) PCT Pub. No.: WO2022/139092

PCT Pub. Date: Jun. 30, 2022

(65) Prior Publication Data

US 2024/0048326 A1 Feb. 8, 2024

(30) Foreign Application Priority Data

Dec. 24, 2020 (KR) ........................ 10-2020-0183743
Dec. 24, 2020 (KR) ........................ 10-2020-0183802

(51) Int. Cl.
*H04L 5/00* (2006.01)
*H04W 64/00* (2009.01)

(52) U.S. Cl.
CPC .......... *H04L 5/0051* (2013.01); *H04L 5/0055* (2013.01); *H04W 64/00* (2013.01)

(58) Field of Classification Search
CPC ... H04L 5/0051; H04L 5/0055; H04L 1/1825; H04L 1/1861; H04L 1/1896; H04W 64/00; H04W 56/001; G01S 1/20
See application file for complete search history.

(56) References Cited

U.S. PATENT DOCUMENTS 12,273,294 B2 * 4/2025 Baek ..................... H04L 5/0033
12,445,814 B2 * 10/2025 Baek ..................... H04W 72/04
(Continued)

FOREIGN PATENT DOCUMENTS

JP 2017525195 A * 8/2017 ........... G01S 1/0428
KR 20090019662 2/2009
(Continued)

OTHER PUBLICATIONS

"Handbook of Position Location: Theory, Practice, and Advances", Wiley-IEEE Press 2019, Edition 2 (Year: 2019).*

*Primary Examiner* — Phirin Sam
*Assistant Examiner* — Louis Samara
(74) *Attorney, Agent, or Firm* — BRYAN CAVE LEIGHTON PAISNER LLP

(57) ABSTRACT

Disclosed are a method by which a first terminal receives a request PRS in a wireless communication system supporting a sidelink, and a device therefor, according to various embodiments. The method comprises the steps of: receiving a first positioning signal including scheduling information for a request PRS; receiving the request PRS requesting transmission of a response PRS on the basis of the scheduling information; transmitting a second positioning signal scheduled for the response PRS; and transmitting the response PRS, wherein a PRS pattern is determined on the basis of whether the response PRS is an acknowledgment/

(Continued)

negative-acknowledgment (ACK/NACK) for the request PRS.

10 Claims, 16 Drawing Sheets

(56) References Cited

U.S. PATENT DOCUMENTS

| | | | | |
|---|---|---|---|---|
| 2017/0212206 | A1* | 7/2017 | Kim | G01S 5/0205 |
| 2019/0230618 | A1* | 7/2019 | Saur | H04W 56/001 |
| 2020/0028648 | A1* | 1/2020 | Akkarakaran | H04W 76/27 |
| 2021/0297216 | A1* | 9/2021 | Shreevastav | H04L 5/0048 |
| 2025/0220605 | A1* | 7/2025 | Hwang | H04W 56/0015 |

FOREIGN PATENT DOCUMENTS

| | | | | |
|---|---|---|---|---|
| KR | 20200028648 A * | 3/2020 | | G01S 13/86 |
| WO | 2016013852 | 1/2016 | | |
| WO | 2019031782 | 2/2019 | | |
| WO | WO-2020026211 A1 * | 2/2020 | | G01S 1/0428 |

* cited by examiner (a)

(b)

(a)

(b)

METHOD BY WHICH TERMINAL TRANSMITS AND RECEIVES SIGNALS RELATED TO POSITIONING IN WIRELESS COMMUNICATION SYSTEM SUPPORTING SIDELINK, AND DEVICE THEREFOR

CROSS-REFERENCE TO RELATED APPLICATIONS

This application is a National Phase application under 35 U.S.C. 371 of International Application No. PCT/KR2021/008322, filed on Jul. 1, 2021, which claims the benefit of Korean Application Nos. 10-2020-0183743, filed on Dec. 24, 2020 and 10-2020-0183802, filed on Dec. 24, 2020, the contents of which are incorporated by reference herein in their entirety.

TECHNICAL FIELD

The present disclosure relates to a method by which a user equipment (UE) transmits and receives a signal related to positioning in a wireless communication system supporting sidelink, and more particularly, to a method of transmitting and receiving acknowledgement/negative-acknowledgment (ACK/NACK) information based on a positioning reference signal (PRS) and apparatus therefor.

BACKGROUND

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A sidelink (SL) refers to a communication method in which a direct link is established between user equipment (UE), and voice or data is directly exchanged between terminals without going through a base station (BS). SL is being considered as one way to solve the burden of the base station due to the rapidly increasing data traffic.

V2X (vehicle-to-everything) refers to a communication technology that exchanges information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive Machine Type Communication (MTC), and Ultra-Reliable and Low Latency Communication (URLLC) may be referred to as new radio access technology (RAT) or new radio (NR). Even in NR, vehicle-to-everything (V2X) communication may be supported.

FIG. 1 is a diagram comparing RAT-based V2X communication before NR with NR-based V2X communication.

Regarding V2X communication, in RAT prior to NR, a scheme for providing a safety service based on V2X messages such as a basic safety message (BSM), a cooperative awareness message (CAM), and a decentralized environmental notification message (DENM) was mainly discussed. The V2X message may include location information, dynamic information, and attribute information. For example, the UE may transmit a periodic message type CAM and/or an event triggered message type DENM to another UE.

For example, the CAM may include dynamic state information about a vehicle such as direction and speed, vehicle static data such as dimensions, and basic vehicle information such as external lighting conditions and route details. For example, a UE may broadcast the CAM, and the CAM latency may be less than 100 ms. For example, when an unexpected situation such as a breakdown of the vehicle or an accident occurs, the UE may generate a DENM and transmit the same to another UE. For example, all vehicles within the transmission coverage of the UE may receive the CAM and/or DENM. In this case, the DENM may have a higher priority than the CAM.

Regarding V2X communication, various V2X scenarios have been subsequently introduced in NR. For example, the various V2X scenarios may include vehicle platooning, advanced driving, extended sensors, and remote driving.

For example, based on vehicle platooning, vehicles may dynamically form a group and move together. For example, to perform platoon operations based on vehicle platooning, vehicles belonging to the group may receive periodic data from a leading vehicle. For example, the vehicles belonging to the group may reduce or increase the distance between the vehicles based on the periodic data.

For example, based on advanced driving, a vehicle may be semi-automated or fully automated. For example, each vehicle may adjust trajectories or maneuvers based on data acquired from local sensors of nearby vehicles and/or nearby logical entities. Also, for example, each vehicle may share driving intention with nearby vehicles.

For example, on the basis of extended sensors, raw data or processed data acquired through local sensors, or live video data may be exchanged between a vehicle, a logical entity, UEs of pedestrians and/or a V2X application server. Thus, for example, the vehicle may recognize an environment that is improved over an environment that may be detected using its own sensor.

For example, for a person who cannot drive or a remote vehicle located in a dangerous environment, a remote driver or V2X application may operate or control the remote vehicle based on remote driving. For example, when a route is predictable as in the case of public transportation, cloud computing-based driving may be used to operate or control the remote vehicle. For example, access to a cloud-based back-end service platform may be considered for remote driving.

A method to specify service requirements for various V2X scenarios such as vehicle platooning, advanced driving, extended sensors, and remote driving is being discussed in the NR-based V2X communication field.

SUMMARY

The object of the present disclosure is to provide a method and apparatus for efficiently transmitting an acknowledgement/negative-acknowledgment (ACK/NACK) based on the characteristics of positioning signaling and/or a positioning reference signal (PRS) for positioning.

It will be appreciated by those of ordinary skill in the art to which the embodiment(s) pertain that the objects that could be achieved with the embodiment(s) are not limited to what has been particularly described hereinabove and the above and other objects will be more clearly understood from the following detailed description.

In an aspect of the present disclosure, there is provided a method of receiving, by a first user equipment (UE), a request positioning reference signal (PRS) in a wireless communication system supporting sidelink. The method may include: receiving a first positioning signal including scheduling information on the request PRS; receiving the request PRS requesting transmission of a response PRS based on the scheduling information; transmitting a second positioning signal scheduling the response PRS; and transmitting the response PRS. A PRS pattern of the response PRS may be determined based on an acknowledgment/negative-acknowledgment (ACK/NACK) for the request PRS.

Alternatively, based on the NACK for the request PRS, the response PRS may have a second PRS pattern obtained by inverting a first PRS pattern scheduled by the second positioning signal in a frequency domain.

Alternatively, based on the NACK for the request PRS, the response PRS may have a second PRS pattern obtained by inverting a first PRS pattern scheduled by the second positioning signal in a time domain.

Alternatively, based on the ACK for the request PRS, the response PRS may have a PRS pattern corresponding to a first PRS pattern scheduled by the second positioning signal.

Alternatively, when a plurality of reception timings are measured based on the request PRS, the response PRS may have a PRS pattern corresponding to the NACK.

Alternatively, when a difference between a first positioning quality indicator (PQI) for the second UE included in the first positioning signal and a second PQI measured based on the request PRS is greater than or equal to a predetermined difference, the response PRS may have a PRS pattern corresponding to the NACK.

Alternatively, the first positioning signal may be received over a physical sidelink control channel (PSCCH) including first sidelink control information or a physical sidelink shared channel (PSSCH) on which second sidelink control information is piggybacked.

Alternatively, the first UE may be configured to request the second UE to retransmit at least one of the first positioning signal and the request PRS by transmitting the response PRS with a PRS pattern corresponding to the NACK.

In another aspect of the present disclosure, there is provided a method of receiving, by a second UE, a response PRS in a wireless communication system supporting sidelink. The method may include: transmitting a first positioning signal including scheduling information on a request PRS; transmitting the request PRS requesting transmission of the response PRS; receiving a second positioning signal scheduling the response PRS; and receiving the response PRS based on the second positioning signal. The second UE may be configured to obtain ACK/NACK information for the request PRS based on the second positioning signal and a PRS pattern of the response PRS.

Alternatively, when the response PRS has a second PRS pattern different from a first PRS pattern included in the second positioning signal, the second UE may be configured to determine that the NACK information is included. The second PRS pattern may correspond to a PRS pattern obtained by inverting the first PRS pattern in a frequency domain.

In another aspect of the present disclosure, there is provided a first UE configured to receive a request PRS in a wireless communication system supporting sidelink communication. The first UE may include: a radio frequency (RF) transceiver; and a processor connected to the RF transceiver. The processor may be configured to control the RF transceiver to: receive a first positioning signal including scheduling information on the request PRS; receive the request PRS requesting transmission of a response PRS based on the scheduling information; transmit a second positioning signal scheduling the response PRS; and transmit the response PRS. A PRS pattern of the response PRS may be determined based on an acknowledgment/negative-acknowledgment (ACK/NACK) for the request PRS.

In another aspect of the present disclosure, there is provided a second UE configured to receive a response PRS in a wireless communication system supporting sidelink. The second UE may include: an RF transceiver; and a processor connected to the RF transceiver. The processor may be configured to control the RF transceiver to: transmit a first positioning signal including scheduling information on a request PRS; transmit the request PRS requesting transmission of the response PRS; receive a second positioning signal scheduling the response PRS; and receive the response PRS based on the second positioning signal. The second UE may be configured to obtain ACK/NACK information for the request PRS based on the second positioning signal and a PRS pattern of the response PRS.

In another aspect of the present disclosure, there is provided a chipset configured to receive a request PRS in a wireless communication system supporting sidelink. The chipset may include: at least one processor; and at least one memory operably connected to the at least one processor and configured to, when executed, cause the at least one processor to perform operations. The operations may include: receiving a first positioning signal including scheduling information on the request PRS; receiving the request PRS requesting transmission of a response PRS based on the scheduling information; transmitting a second positioning signal scheduling the response PRS; and transmitting the response PRS. A PRS pattern of the response PRS may be determined based on an ACK/NACK for the request PRS.

Alternatively, the processor may be configured to control a driving mode of a device connected to the chipset based on the first positioning signal.

In a further aspect of the present disclosure, there is provided a computer-readable storage medium including at least one computer program configured to cause at least one processor to receive a request PRS in a wireless communication system supporting sidelink. The at least one computer program may be configured to cause the at least one processor to perform operations for receiving the request PRS, and the at least one computer program may be stored on the computer-readable storage medium. The operations may include: receiving a first positioning signal including scheduling information on the request PRS; receiving the request PRS requesting transmission of a response PRS based on the scheduling information; transmitting a second positioning signal scheduling the response PRS; and transmitting the response PRS. A PRS pattern of the response PRS may be determined based on an ACK/NACK for the request PRS.

According to various embodiments, an acknowledgment/negative-acknowledgment (ACK/NACK) may be efficiently transmitted based on the characteristics of positioning signaling and/or a positioning reference signal (PRS) for positioning.

Effects to be achieved by various embodiments are not limited to what has been particularly described hereinabove and other effects not mentioned herein will be more clearly understood by persons skilled in the art to which the present disclosure pertains from the following detailed description.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure.

DETAILED DESCRIPTION

Figure 1:
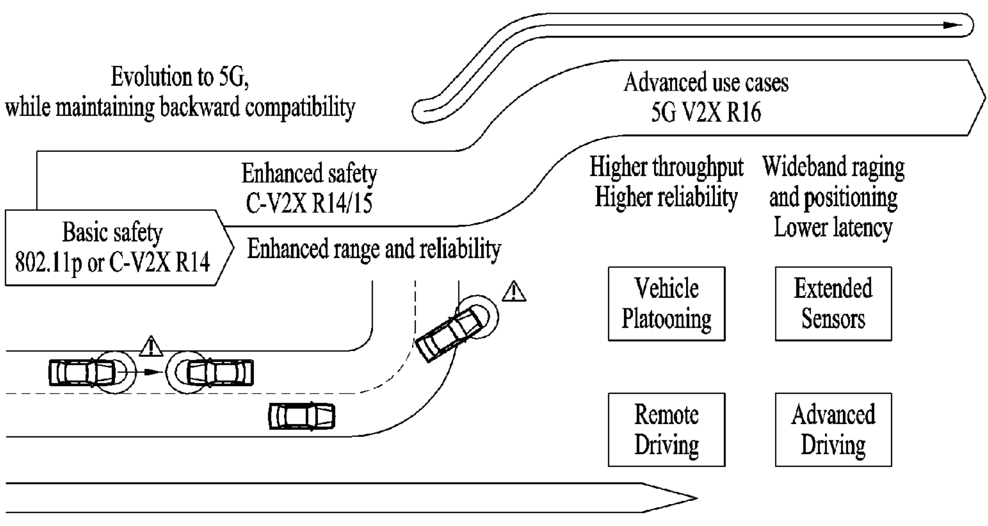
FIG. 1 is a diagram for explaining and comparing vehicle-to-everything (V2X) communication based on radio access technology (RAT) before new radio (NR) and V2X communication based on NR.

The wireless communication system is a multiple access system that supports communication with multiple users by sharing available system resources (e.g., bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency (SC-FDMA) system, a multi carrier frequency division multiple access (MC-FDMA) system, and the like.

A sidelink refers to a communication scheme in which a direct link is established between user equipments (UEs) to directly exchange voice or data between UEs without assistance from a base station (BS). The sidelink is being considered as one way to address the burden on the BS caused by rapidly increasing data traffic.

Vehicle-to-everything (V2X) refers to a communication technology for exchanging information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive MTC, and Ultra-Reliable and Low Latency Communication (URLLC) may be referred to as new radio access technology (RAT) or new radio (NR). Even in NR, V2X communication may be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. IEEE 802.16m is an evolution of IEEE 802.16e and provides backward compatibility with a system based on IEEE 802.16e. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE.

5G NR is a successor technology of LTE-A and is a new clean-slate mobile communication system with characteristics such as high performance, low latency, and high availability. 5G NR may utilize all available spectrum resources, from low frequency bands below 1 GHz to intermediate frequency bands from 1 GHz to 10 GHz and high frequency (millimeter wave) bands above 24 GHz.

For clarity of explanation, LTE-A or 5G NR is mainly described, but the technical spirit of the embodiment(s) is not limited thereto.

Figure 2:
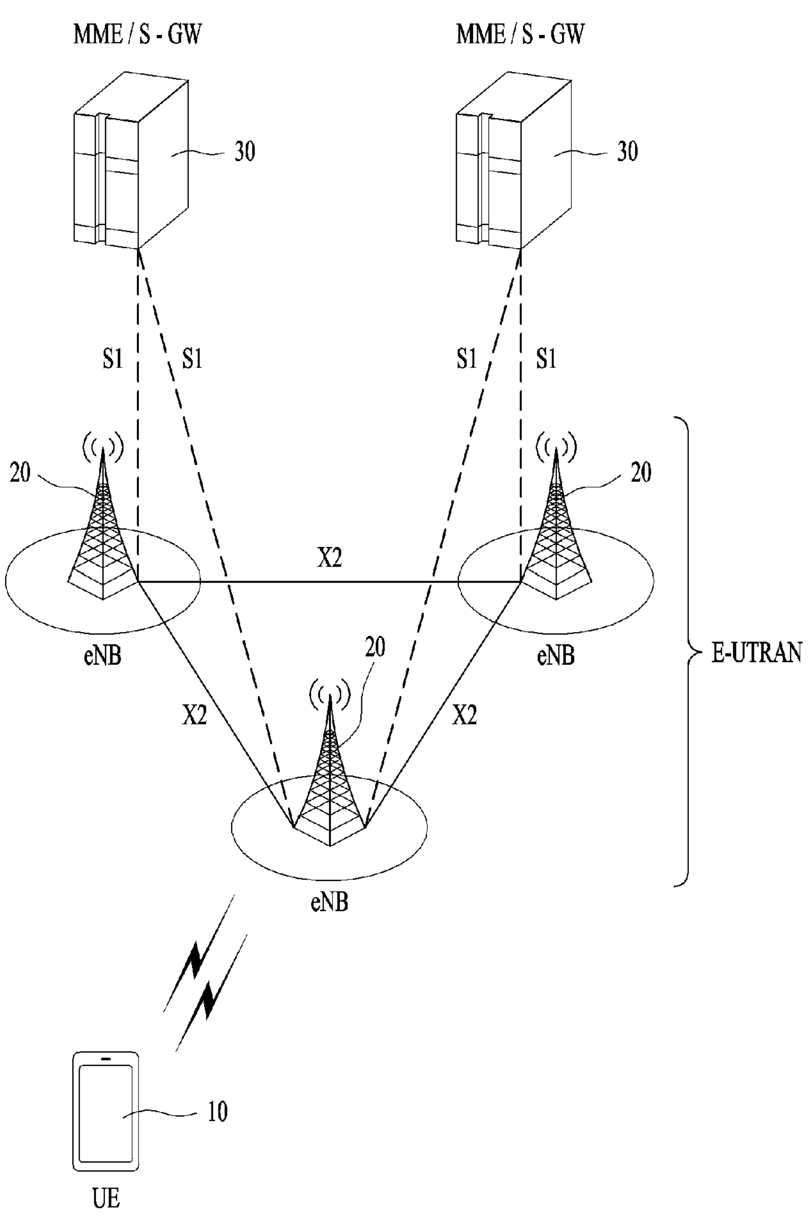
FIG. 2 illustrates the structure of a Long Term Evolution (LTE) system.

FIG. 2 illustrates the structure of an LTE system to which the present disclosure is applicable. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
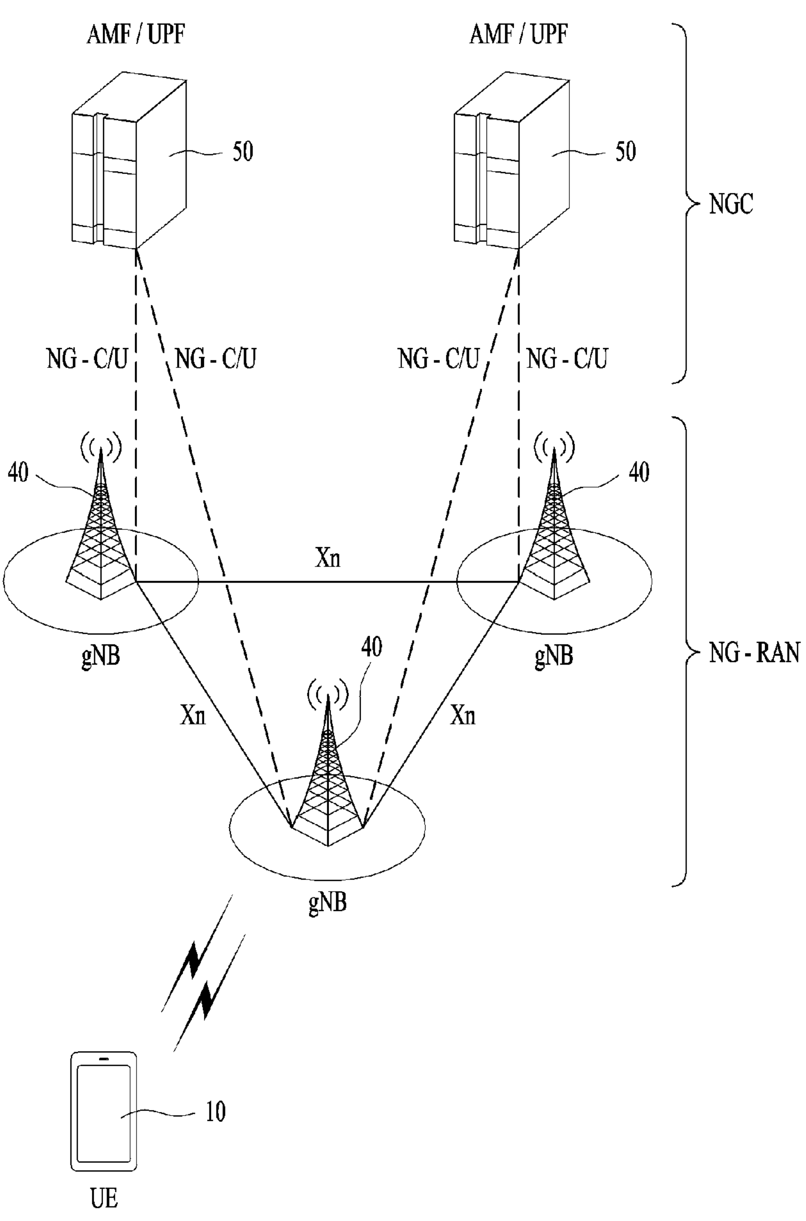
FIG. 3 illustrates the structure of a NR system.

FIG. 3 illustrates the structure of a NR system to which the present disclosure is applicable.

Referring to FIG. 3, a next generation radio access network (NG-RAN) may include a next generation Node B (gNB) and/or an eNB, which provides user-plane and control-plane protocol termination to a UE. In FIG. 3, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 4:
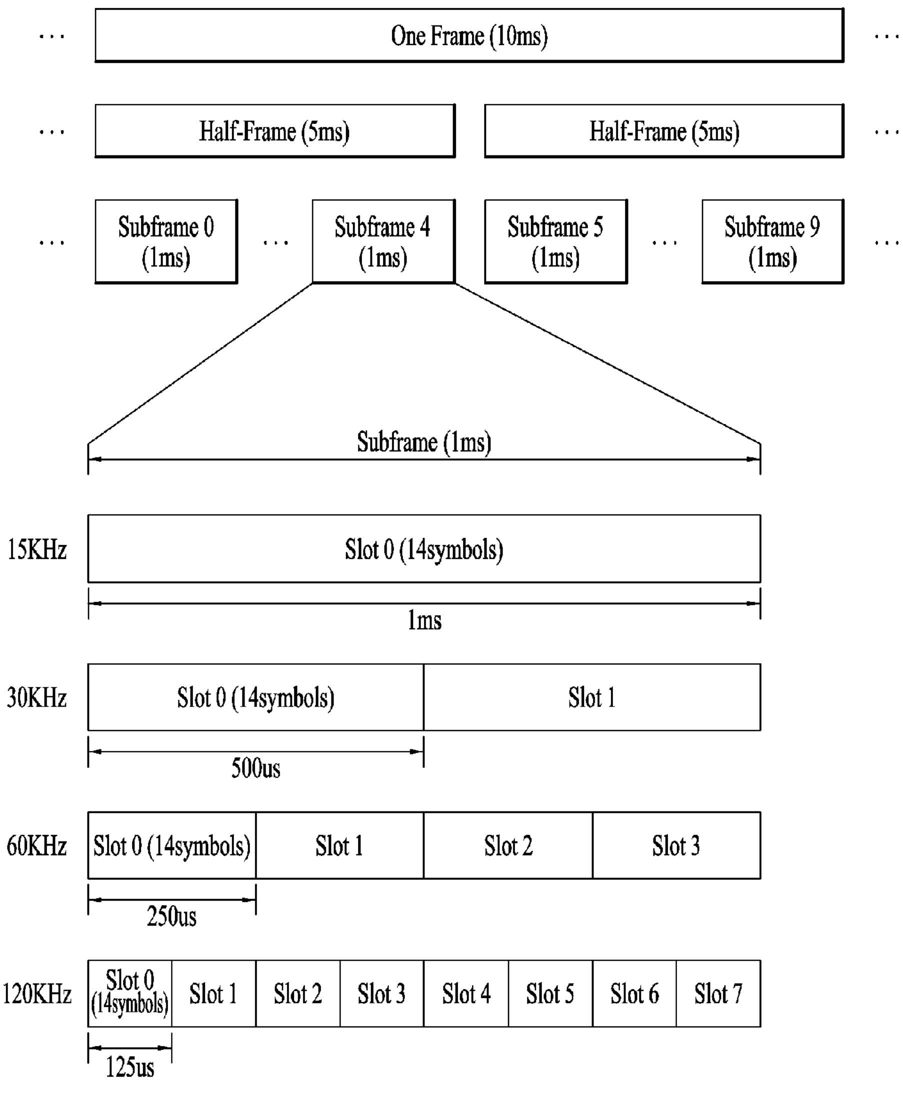
FIG. 4 illustrates the structure of a NR radio frame.

FIG. 4 illustrates the structure of a NR radio frame to which the present disclosure is applicable.

Referring to FIG. 4, a radio frame may be used for UL transmission and DL transmission in NR. A radio frame is 10 ms in length and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot ($N^{slot}_{symb}$), the number of slots per frame ($N^{frame,u}_{slot}$), and the number of slots per subframe ($N^{subframe,u}_{slot}$) according to an SCS configuration μ in the NCP case.

TABLE 1

| SCS (15*2^u) | $N^{slot}_{symb}$ | $N^{frame,u}_{slot}$ | $N^{subframe,u}_{slot}$ |
|---|---|---|---|
| 15 kHz (u = 0) | 14 | 10 | 1 |
| 30 kHz (u = 1) | 14 | 20 | 2 |
| 60 kHz (u = 2) | 14 | 40 | 4 |
| 120 kHz (u = 3) | 14 | 80 | 8 |
| 240 kHz (u = 4) | 14 | 160 | 16 |

Table 2 below lists the number of symbols per slot, the number of slots per frame, and the number of slots per subframe according to an SCS in the ECP case.

TABLE 2

| SCS (15*2^u) | $N^{slot}_{symb}$ | $N^{frame,u}_{slot}$ | $N^{subframe,u}_{slot}$ |
|---|---|---|---|
| 60 kHz (u = 2) | 12 | 40 | 4 |

In the NR system, different OFDM(A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description).

In NR, multiple numerologies or SCSs to support various 5G services may be supported. For example, a wide area in conventional cellular bands may be supported when the SCS is 15 kHz, and a dense urban environment, lower latency, and a wider carrier bandwidth may be supported when the SCS is 30 kHz/60 kHz. When the SCS is 60 kHz or higher, a bandwidth wider than 24.25 GHz may be supported to overcome phase noise.

The NR frequency band may be defined as two types of frequency ranges. The two types of frequency ranges may be FR1 and FR2. The numerical values of the frequency ranges may be changed. For example, the two types of frequency ranges may be configured as shown in Table 3 below. Among the frequency ranges used in the NR system, FR1 may represent "sub 6 GHz range" and FR2 may represent "above 6 GHz range" and may be called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical values of the frequency ranges of the NR system may be changed. For example, FR1 may include a band of 410 MHz to 7125 MHz as shown in Table 4 below. That is, FR1 may include a frequency band of 6 GHz (or 5850 MHz, 5900 MHz, 5925 MHz, etc.) or higher. For example, the frequency band of 6 GHz (or 5850 MHz, 5900 MHz, 5925 MHz, etc.) or higher included in FR1 may include an unlicensed band. The unlicensed band may be used for various purposes, for example, for communication for vehicles (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
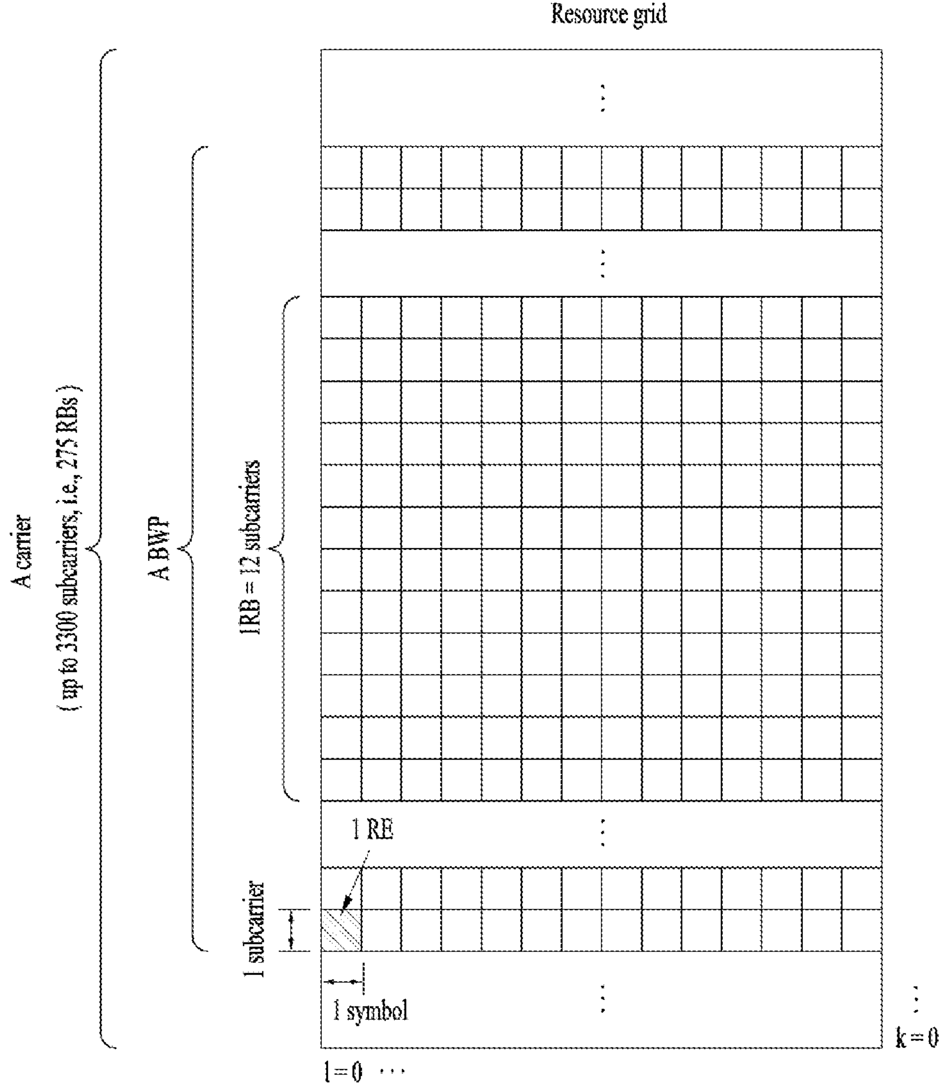
FIG. 5 illustrates the slot structure of a NR frame.

FIG. 5 illustrates the slot structure of a NR frame to which the present disclosure is applicable.

Referring to FIG. 5, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element may be referred to as a resource element (RE) and may be mapped to one complex symbol.

The wireless interface between UEs or the wireless interface between a UE and a network may be composed of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Hereinafter, V2X or sidelink (SL) communication will be described.

Figure 6:
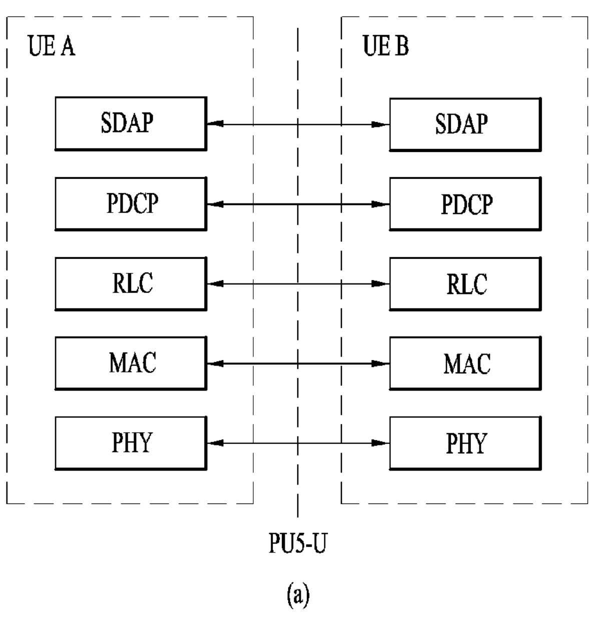
FIG. 6 illustrates a radio protocol architecture for sidelink (SL) communication.
Figure 6:
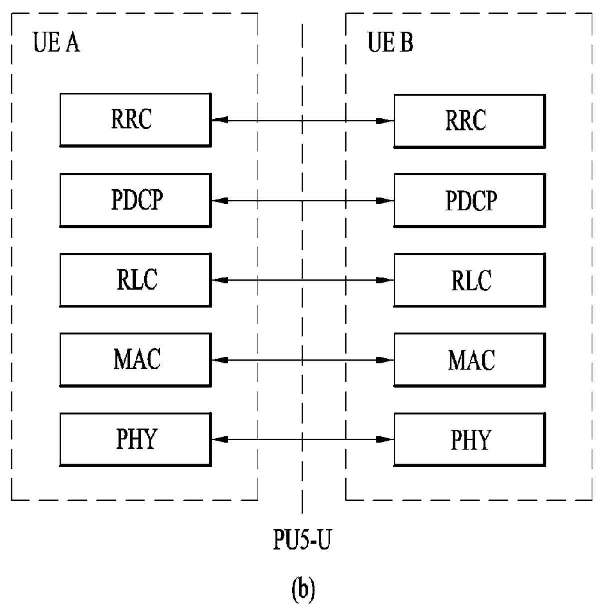

FIG. 6 illustrates a radio protocol architecture for SL communication. Specifically, FIG. 6-(*a*) shows a user plane protocol stack of NR, and FIG. 6-(*b*) shows a control plane protocol stack of NR.

Hereinafter, a sidelink synchronization signal (SLSS) and synchronization information will be described.

The SLSS is an SL-specific sequence and may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, the UE may detect an initial signal and acquire synchronization using the S-PSS. For example, the UE may acquire detailed synchronization using the S-PSS and the S-SSS, and may detect a synchronization signal ID.

A physical sidelink broadcast channel (PSBCH) may be a (broadcast) channel on which basic (system) information that the UE needs to know first before transmission and reception of an SL signal is transmitted. For example, the basic information may include SLSS related information, a duplex mode (DM), time division duplex uplink/downlink (TDD UL/DL) configuration, resource pool related information, the type of an application related to the SLSS, a subframe offset, and broadcast information. For example, for evaluation of PSBCH performance, the payload size of PSBCH in NR V2X may be 56 bits including CRC of 24 bits.

The S-PSS, S-SSS, and PSBCH may be included in a block format (e.g., an SL synchronization signal (SS)/PSBCH block, hereinafter sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in the carrier, and the transmission bandwidth thereof may be within a (pre)set sidelink BWP (SL BWP). For example, the bandwidth of the S-SSB may be 11 resource blocks (RBs). For example, the PSBCH may span 11 RBs. The frequency position of the S-SSB may be (pre)set. Accordingly, the UE does not need to perform hypothesis detection at a frequency to discover the S-SSB in the carrier.

In the NR SL system, a plurality of numerologies having different SCSs and/or CP lengths may be supported. In this case, as the SCS increases, the length of the time resource in which the transmitting UE transmits the S-SSB may be shortened. Thereby, the coverage of the S-SSB may be narrowed. Accordingly, in order to guarantee the coverage of the S-SSB, the transmitting UE may transmit one or more S-SSBs to the receiving UE within one S-SSB transmission period according to the SCS. For example, the number of S-SSBs that the transmitting UE transmits to the receiving UE within one S-SSB transmission period may be pre-configured or configured for the transmitting UE. For example, the S-SSB transmission period may be 160 ms. For example, for all SCSs, the S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two, or four S-SSBs to the receiving UE within one S-SSB transmission period.

For example, when the SCS is 60 kHz in FR2, the transmitting UE may transmit 1, 2, 4, 8, 16 or 32 S-SSBs to the receiving UE within one S-SSB transmission period. For example, when SCS is 120 kHz in FR2, the transmitting UE may transmit 1, 2, 4, 8, 16, 32 or 64 S-SSBs to the receiving UE within one S-SSB transmission period.

When the SCS is 60 kHz, two types of CPs may be supported. In addition, the structure of the S-SSB transmitted from the transmitting UE to the receiving UE may depend on the CP type. For example, the CP type may be normal CP (NCP) or extended CP (ECP). Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol in the S-SSB transmitted by the transmitting UE. For example, upon receiving the S-SSB, the receiving UE may perform an automatic gain control (AGC) operation in the period of the first symbol for the S-SSB.

Figure 7:
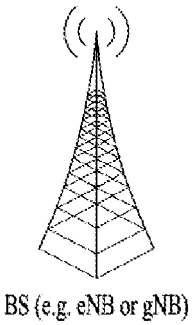
FIG. 7 illustrates user equipments (UEs) performing V2X or SL communication.
Figure 7:
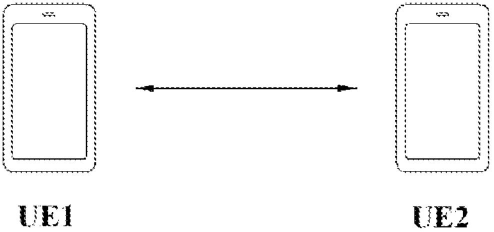

FIG. 7 illustrates UEs performing V2X or SL communication.

Referring to FIG. 7, in V2X or SL communication, the term UE may mainly refer to a user's UE. However, when network equipment such as a BS transmits and receives signals according to a communication scheme between UEs, the BS may also be regarded as a kind of UE. For example, UE 1 may be the first device 100, and UE 2 may be the second device 200.

For example, UE 1 may select a resource unit corresponding to a specific resource in a resource pool, which represents a set of resources. Then, UE 1 may transmit an SL signal through the resource unit. For example, UE 2, which is a receiving UE, may receive a configuration of a resource pool in which UE 1 may transmit a signal, and may detect a signal of UE 1 in the resource pool.

Here, when UE 1 is within the connection range of the BS, the BS may inform UE 1 of a resource pool. On the other hand, when the UE 1 is outside the connection range of the BS, another UE may inform UE 1 of the resource pool, or UE 1 may use a preconfigured resource pool.

In general, the resource pool may be composed of a plurality of resource units, and each UE may select one or multiple resource units and transmit an SL signal through the selected units.

Figure 8:
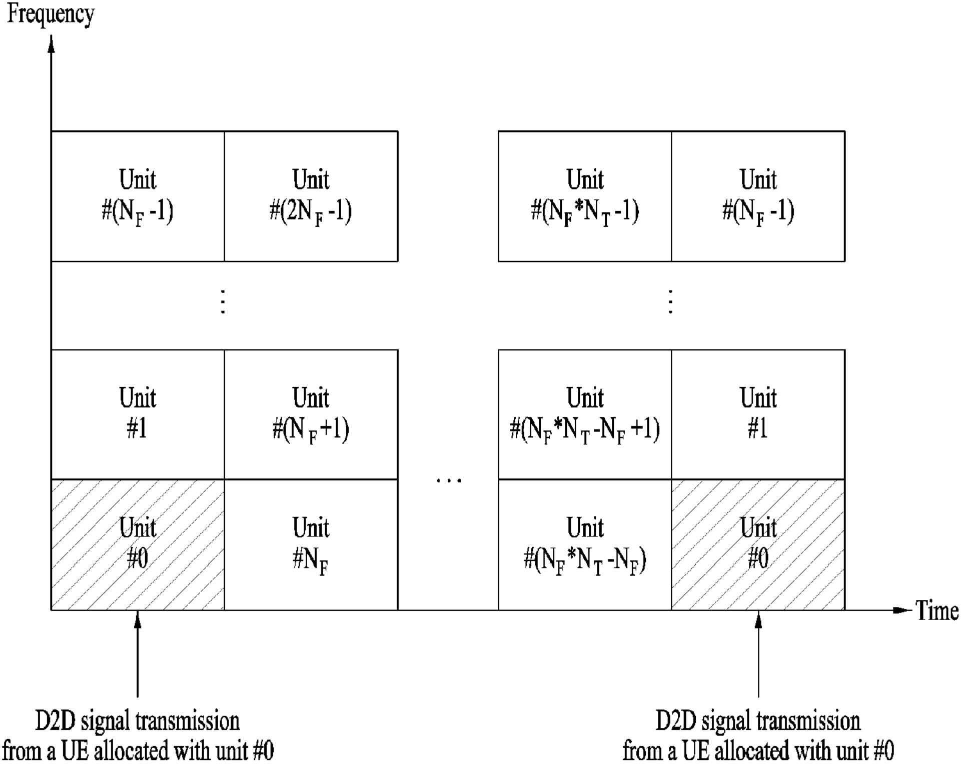
FIG. 8 illustrates resource units for V2X or SL communication.

FIG. 8 illustrates resource units for V2X or SL communication.

Referring to FIG. 8, the frequency resources of a resource pool may be divided into NF sets, and the time resources of the resource pool may be divided into NT sets. Accordingly, a total of NF*NT resource units may be defined in the resource pool. FIG. 8 shows an exemplary case where the resource pool is repeated with a periodicity of NT subframes.

As shown in FIG. 8, one resource unit (e.g., Unit #0) may appear periodically and repeatedly. Alternatively, in order to obtain a diversity effect in the time or frequency dimension, an index of a physical resource unit to which one logical resource unit is mapped may change in a predetermined pattern over time. In this structure of resource units, the resource pool may represent a set of resource units available to a UE which intends to transmit an SL signal.

Resource pools may be subdivided into several types. For example, according to the content in the SL signal transmitted in each resource pool, the resource pools may be divided as follows.

(1) Scheduling assignment (SA) may be a signal including information such as a position of a resource through which a transmitting UE transmits an SL data channel, a modulation and coding scheme (MCS) or multiple input multiple output (MIMO) transmission scheme required for demodulation of other data channels, and timing advance (TA). The SA may be multiplexed with SL data and transmitted through the same resource unit. In this case, an SA resource pool may represent a resource pool in which SA is multiplexed with SL data and transmitted. The SA may be referred to as an SL control channel.

(2) SL data channel (physical sidelink shared channel (PSSCH)) may be a resource pool through which the transmitting UE transmits user data. When the SA and SL data are multiplexed and transmitted together in the same resource unit, only the SL data channel except for the SA information may be transmitted in the resource pool for the SL data channel. In other words, resource elements (REs) used to transmit the SA information in individual resource units in the SA resource pool may still be used to transmit the SL data in the resource pool of the SL data channel. For example, the transmitting UE may map the PSSCH to consecutive PRBs and transmit the same.

(3) The discovery channel may be a resource pool used for the transmitting UE to transmit information such as the ID thereof. Through this channel, the transmitting UE may allow a neighboring UE to discover the transmitting UE.

Even when the SL signals described above have the same content, they may use different resource pools according to the transmission/reception properties of the SL signals. For example, even when the SL data channel or discovery message is the same among the signals, it may be classified into different resource pools according to determination of the SL signal transmission timing (e.g., transmission at the reception time of the synchronization reference signal or transmission by applying a predetermined TA at the reception time), a resource allocation scheme (e.g., the BS designates individual signal transmission resources to individual transmitting UEs or individual transmission UEs select individual signal transmission resources within the resource pool), signal format (e.g., the number of symbols occupied by each SL signal in a subframe, or the number of subframes used for transmission of one SL signal), signal strength from a BS, the strength of transmit power of an SL UE, and the like.

Hereinafter, resource allocation in the SL will be described.

Figure 9:
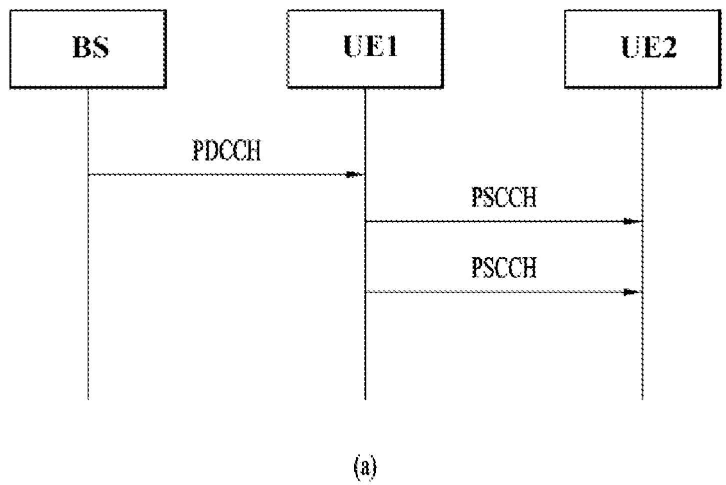
FIG. 9 illustrates a procedure in which UEs perform V2X or SL communication depending on transmission modes.
Figure 9:
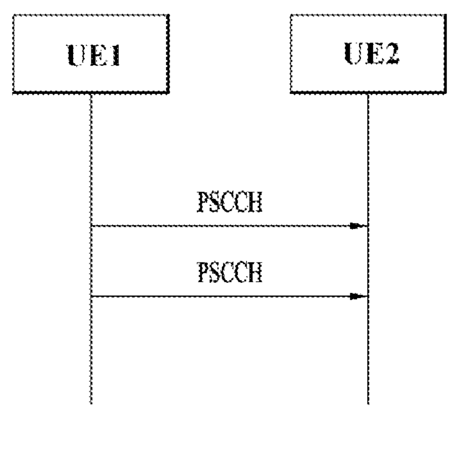

FIG. 9 illustrates a procedure in which UEs perform V2X or SL communication according to a transmission mode. In various embodiments of the present disclosure, the transmission mode may be referred to as a mode or a resource allocation mode. Hereinafter, for simplicity, the transmission mode in LTE may be referred to as an LTE transmission mode, and the transmission mode in NR may be referred to as a NR resource allocation mode.

For example, FIG. 9-(*a*) illustrates a UE operation related to LTE transmission mode 1 or LTE transmission mode 3. Alternatively, for example, FIG. 9-(*a*) illustrates a UE operation related to NR resource allocation mode 1. For example, LTE transmission mode 1 may be applied to general SL communication, and LTE transmission mode 3 may be applied to V2X communication.

For example, FIG. 9-(*b*) illustrates a UE operation related to LTE transmission mode 2 or LTE transmission mode 4. Alternatively, for example, FIG. 9-(*b*) illustrates a UE operation related to NR resource allocation mode 2.

Referring to FIG. 9-(*a*), in LTE transmission mode 1, LTE transmission mode 3 or NR resource allocation mode 1, the BS may schedule an SL resource to be used by the UE for SL transmission. For example, the BS may perform resource scheduling for UE 1 through PDCCH (more specifically, downlink control information (DCI)), and UE 1 may perform V2X or SL communication with UE 2 according to the resource scheduling. For example, UE 1 may transmit sidelink control information (SCI) to UE 2 on a physical sidelink control channel (PSCCH), and then transmit data which is based on the SCI to UE 2 on a physical sidelink shared channel (PSSCH).

For example, in NR resource allocation mode 1, the UE may be provided with or allocated resources for one or more SL transmissions of a transport block (TB) from the BS through a dynamic grant. For example, the BS may provide a resource for transmission of the PSCCH and/or PSSCH to the UE using the dynamic grant. For example, the transmitting UE may report the SL hybrid automatic repeat request (HARQ) feedback received from the receiving UE to the BS. In this case, the PUCCH resource and timing for reporting the SL HARQ feedback to the BS may be determined based on an indication in the PDCCH through the BS is to allocate a resource for SL transmission.

For example, DCI may include a slot offset between DCI reception and the first SL transmission scheduled by the DCI. For example, the minimum gap between the DCI scheduling a SL transmission resource and the first scheduled SL transmission resource may not be shorter than the processing time of the corresponding UE.

For example, in NR resource allocation mode 1, the UE may be periodically provided with or allocated a resource set from the BS for a plurality of SL transmissions through a configured grant. For example, the configured grant may include configured grant type 1 or configured grant type 2.

For example, the UE may determine a TB to be transmitted on each occasion indicated by a given configured grant.

For example, the BS may allocate SL resources to the UE on the same carrier and may allocate SL resources to the UE on different carriers.

For example, a NR BS may control LTE-based SL communication. For example, the NR BS may transmit NR DCI to the UE to schedule an LTE SL resource. In this case, for example, a new RNTI for scrambling the NR DCI may be defined. For example, the UE may include a NR SL module and an LTE SL module.

For example, after the UE including the NR SL module and the LTE SL module receives NR SL DCI from the gNB, the NR SL module may transform the NR SL DCI to LTE DCI type 5A, and the NR SL module may deliver LTE DCI type 5A to the LTE SL module in units of X ms. For example, the LTE SL module may apply activation and/or release to the first LTE subframe Z ms after the LTE SL module receives LTE DCI format 5A from the NR SL module. For example, the X may be dynamically indicated using a field of DCI. For example, the minimum value of X may depend on the UE capability. For example, the UE may report a single value according to the UE capability. For example, X may be a positive number.

Referring to FIG. 9-(*b*), in LTE transmission mode 2, LTE transmission mode 4, or NR resource allocation mode 2, the UE may determine AN SL resource within the SL resources configured by the BS/network or the preconfigured SL resources. For example, the configured SL resources or the preconfigured SL resources may be a resource pool. For example, the UE may autonomously select or schedule a resource for SL transmission. For example, the UE may autonomously select a resource within the configured resource pool to perform SL communication. For example, the UE may select a resource within a selection window by performing a sensing and resource (re)selection procedure. For example, the sensing may be performed on a per sub-channel basis. In addition, UE 1, which has selected a resource within the resource pool, may transmit SCI to UE 2 through the PSCCH, and then transmit data, which is based on the SCI, to UE 2 through the PSSCH.

For example, a UE may assist in selecting an SL resource for another UE. For example, in NR resource allocation mode 2, the UE may receive a configured grant for SL transmission. For example, in NR resource allocation mode 2, the UE may schedule SL transmission of another UE. For example, in NR resource allocation mode 2, the UE may reserve an SL resource for blind retransmission.

For example, in NR resource allocation mode 2, UE 1 may indicate the priority of SL transmission to UE 2 using the SCI. For example, UE 2 may decode the SCI. UE 2 may perform sensing and/or resource (re)selection based on the priority. For example, the resource (re)selection procedure may include an operation of identifying candidate resources in a resource selection window by UE 2, and an operation of selecting, by UE 2, a resource for (re)transmission from among the identified candidate resources. For example, the resource selection window may be a time interval during which the UE selects the resource for SL transmission. For example, after UE 2 triggers resource (re)selection, the resource selection window may start at $T1 \geq 0$. The resource selection window may be limited by the remaining packet delay budget of UE 2. For example, in the operation of identifying the candidate resources in the resource selection window by UE 2, a specific resource may be indicated by the SCI received by UE 2 from UE 1. When the L1 SL RSRP measurement value for the specific resource exceeds an SL RSRP threshold, UE 2 may not determine the specific resource as a candidate resource. For example, the SL RSRP threshold may be determined based on the priority of the SL transmission indicated by the SCI received by UE 2 from UE 1 and the priority of the SL transmission on the resource selected by UE 2.

For example, the L1 SL RSRP may be measured based on an SL demodulation reference signal (DMRS). For example, one or more PSSCH DMRS patterns may be configured or preconfigured for each resource pool in the time domain. For example, PDSCH DMRS configuration type 1 and/or type 2 may be the same as or similar to the frequency domain pattern of the PSSCH DMRS. For example, the exact DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, based on the sensing and resource (re)selection procedure, the transmitting UE may perform initial transmission of a TB without reservation. For example, based on the sensing and resource (re)selection procedure, using the SCI associated with a first TB, the transmitting UE may reserve the SL resource for initial transmission of a second TB.

For example, in NR resource allocation mode 2, the UE may reserve a resource for feedback-based PSSCH retransmission through signaling related to previous transmission of the same TB. For example, the maximum number of SL resources reserved by one transmission including the current transmission may be 2, 3, or 4. For example, the maximum number of SL resources may be the same regardless of whether HARQ feedback is enabled. For example, the maximum number of HARQ (re)transmissions for one TB may be limited by configuration or pre-configuration. For example, the maximum number of HARQ (re)transmissions may be up to 32. For example, when the configuration or pre-configuration is not present, the maximum number of HARQ (re)transmissions may be unspecified. For example, the configuration or pre-configuration may be for the transmitting UE. For example, in NR resource allocation mode 2, HARQ feedback for releasing resources not used by the UE may be supported.

For example, in NR resource allocation mode 2, the UE may indicate to another UE one or more sub-channels and/or slots used by the UE, using the SCI. For example, the UE may indicate to another UE one or more sub-channels and/or slots reserved by the UE for PSSCH (re)transmission, using SCI. For example, the minimum allocation unit of the SL resource may be a slot. For example, the size of the sub-channel may be configured for the UE or may be preconfigured.

Hereinafter, sidelink control information (SCI) will be described.

Control information transmitted by the BS to the UE on the PDCCH may be referred to as downlink control information (DCI), whereas control information transmitted by the UE to another UE on the PSCCH may be referred to as SCI. For example, before decoding the PSCCH, the UE may be aware of the start symbol of the PSCCH and/or the number of symbols of the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, when the SCI configuration fields are divided into two groups in consideration of the (relatively) high SCI payload size, the SCI including a first SCI configuration field group may be referred to as first SCI or 1st SCI, and the SCI including a second SCI configuration field group may be referred to as second SCI or 2nd SCI. For example, the transmitting UE may transmit the first SCI to the receiving UE on the PSCCH. For example, the transmitting UE may transmit the second SCI to the receiving UE on the PSCCH and/or the PSSCH. For example, the second SCI may be transmitted to the receiving UE on the (independent) PSCCH or may be piggybacked together with data and transmitted on the PSSCH. For example, the two consecutive SCIs may be applied for different transmissions (e.g., unicast, broadcast, or groupcast).

For example, the transmitting UE may transmit some or all of the following information to the receiving UE through SCI. Here, for example, the transmitting UE may transmit some or all of the following information to the receiving UE through the first SCI and/or the second SCI:

- PSSCH and/or PSCCH related resource allocation information, for example, the positions/number of time/frequency resources, resource reservation information (e.g., periodicity); and/or
- SL CSI report request indicator or SL (L1) RSRP (and/or SL (L1) RSRQ and/or SL (L1) RSSI) report request indicator; and/or
- SL CSI transmission indicator (or SL (L1) RSRP (and/or SL (L1) RSRQ and/or SL (L1) RSSI) information transmission indicator) (on PSSCH); and/or
- MCS information; and/or
- transmit power information; and/or
- L1 destination ID information and/or L1 source ID information; and/or
- SL HARQ process ID information; and/or
- new data indicator (NDI) information; and/or
- redundancy version (RV) information; and/or
- (transmission traffic/packet related) QoS information; e.g., priority information; and/or
- SL CSI-RS transmission indicator or information on the number of (transmitted) SL CSI-RS antenna ports;
- Location information about the transmitting UE or location (or distance/area) information about a target receiving UE (to which a request for SL HARQ feedback is made); and/or
- information about a reference signal (e.g., DMRS, etc.) related to decoding and/or channel estimation of data transmitted on the PSSCH, for example, information related to a pattern of a (time-frequency) mapping resource of DMRS, rank information, antenna port index information.

For example, the first SCI may include information related to channel sensing. For example, the receiving UE may decode the second SCI using the PSSCH DMRS. A polar code used for the PDCCH may be applied to the second SCI. For example, in the resource pool, the payload size of the first SCI may be the same for unicast, groupcast and broadcast. After decoding the first SCI, the receiving UE does not need to perform blind decoding of the second SCI. For example, the first SCI may include scheduling information about the second SCI.

In various embodiments of the present disclosure, since the transmitting UE may transmit at least one of SCI, the first SCI, and/or the second SCI to the receiving UE on the PSCCH, the PSCCH may be replaced/substituted with at least one of the SCI, the first SCI, and/or the second SCI. Additionally/alternatively, for example, the SCI may be replaced/substituted with at least one of the PSCCH, the first SCI, and/or the second SCI. Additionally/alternatively, for example, since the transmitting UE may transmit the second SCI to the receiving UE on the PSSCH, the PSSCH may be replaced/substituted with the second SCI.

Hereinafter, synchronization acquisition by an SL UE will be described.

In TDMA and FDMA systems, accurate time and frequency synchronization is essential. Inaccurate time and frequency synchronization may lead to degradation of system performance due to inter-symbol interference (ISI) and inter-carrier interference (ICI). The same is true for V2X. For time/frequency synchronization in V2X, a sidelink synchronization signal (SLSS) may be used in the PHY layer, and master information block-sidelink-V2X (MIB-SL-V2X) may be used in the RLC layer.

Tx/Rx Beam Sweep

In case of using a very high frequency such as mmWave, beamforming may be used to overcome pathloss in general. To use beamforming, a best beam pair should be detected from several beam pairs between a Tx end and an Rx end. Such a process may be referred as beam acquisition or beam tracking from the perspective of the Rx end. Particularly, since mmWave uses analog beamforming, a vehicle may need to perform beam sweeping of switching a beam to a different direction in a different time using an antenna array of the vehicle in the course of beam acquisition or beam tracking.

Figure 10:
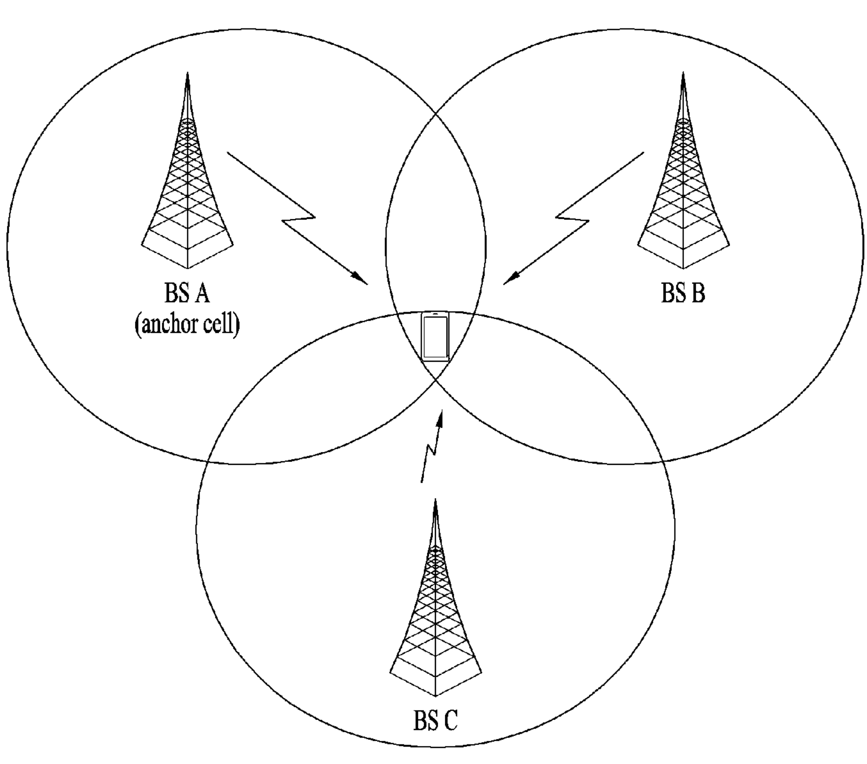
FIG. 10 is a diagram for explaining an Observed Time Difference of Arrival (OTDOA) positioning method to which the present disclosure is applicable.

FIG. 10 is a diagram illustrating an OTDOA positioning method according to an embodiment of the present disclosure.

In the OTDOA positioning method, a UE utilizes measurement timings of DL signals received from multiple TPs including an eNB, an ng-eNB, and a PRS-dedicated TP. The UE measures the timings of the received DL signals using positioning assistance data received from a location server. The location of the UE may be determined based on the measurement results and the geographical coordinates of neighboring TPs.

A UE connected to a gNB may request a measurement gap for OTDOA measurement from a TP. When the UE fails to identify a single frequency network (SFN) for at least one TP in OTDOA assistance data, the UE may use an autonomous gap to acquire the SFN of an OTDOA reference cell before requesting a measurement gap in which a reference signal time difference (RSTD) is measured.

An RSTD may be defined based on a smallest relative time difference between the boundaries of two subframes received from a reference cell and a measurement cell. That is, the RSTD may be calculated as a relative timing difference between a time when the UE receives the start of a subframe from the reference cell and a time when the UE receives the start of a subframe from the measurement cell which is closest to the subframe received from the reference cell. The reference cell may be selected by the UE.

For accurate OTDOA measurement, it is necessary to measure the times of arrival (TOAs) of signals received from three or more geographically distributed TPs or BSs. For example, TOAs for TP 1, TP 2, and TP 3 may be measured, an RSTD for TP 1-TP 2, an RSTD for TP 2-TP 3, and an RSTD for TP 3-TP 1 may be calculated based on the three TOAs, geometric hyperbolas may be determined based on the calculated RSTDs, and a point where these hyperbolas intersect may be estimated as the location of the UE. Accuracy and/or uncertainty may be involved in each TOA measurement, and thus the estimated UE location may be known as a specific range according to the measurement uncertainty.

For example, an RSTD for two TPs may be calculated by Equation 1.

$$RSTDi,1 = \frac{\sqrt{(x_t - x_i)^2 + (y_t - y_i)^2}}{c} - \frac{\sqrt{(x_t - x_1)^2 + (y_t - y_1)^2}}{c} + (T_i - T_1) + (n_i - n_1) \quad \text{[Equation 1]}$$

Here, 'c' is the speed of light, {xt, yt} is the (unknown) coordinates of the target UE, {xi, yi} is the coordinates of a (known) TP, and {x1, y1} is the coordinates of a reference TP (or another TP). (Ti−T1) is a transmission time offset between the two TPs, which may be referred to as "real time difference" (RTD), and 'ni' and 'n1' may represent values related to UE TOA measurement errors.

E-CID (Enhanced Cell ID): In cell ID (CID) positioning, the location of a UE may be measured based on geographic information about the serving ng-eNB, serving gNB and/or serving cell of the UE. For example, the geographic information about the serving ng-eNB, the serving gNB, and/or the serving cell may be obtained by paging, registration, or the like.

For E-CID positioning, an additional UE measurement and/or NG-RAN radio resources may be used to improve a UE location estimate in addition to the CID positioning method. In the E-CID positioning method, although some of the same measurement methods as in the measurement control system of the RRC protocol may be used, an additional measurement is generally not performed only for positioning the UE. In other words, a separate measurement configuration or measurement control message may not be provided to position the UE, and the UE may also report a measured value obtained by generally available measurement methods, without expecting that an additional measurement operation only for positioning will be requested.

For example, the serving gNB may implement the E-CID positioning method using an E-UTRA measurement received from the UE.

Exemplary measurement elements that are available for E-CID positioning are given as follows.

- UE measurements: E-UTRA RSRP, E-UTRA RSRQ, UE E-UTRA Rx-Tx time difference, GSM EDGE random access network (GERAN)/WLAN RSSI, UTRAN common pilot channel (CPICH) received signal code power (RSCP), and UTRAN CPICH Ec/Io.
- E-UTRAN measurements: ng-eNB Rx-Tx time difference, timing advance (TADV), and angle of arrival (AoA).

TADVs may be classified into Type 1 and Type 2 as follows.

TADV Type 1=(ng-eNB Rx-Tx time difference)+(UE E-UTRA Rx-Tx time difference)

TADV Type 2=ng-eNB Rx-Tx time difference

On the other hand, an AoA may be used to measure the direction of the UE. The AoA may be defined as an estimated angle of the UE with respect to the location of the UE counterclockwise from a BS/TP. A geographical reference direction may be north. The BS/TP may use a UL signal such as a sounding reference signal (SRS) and/or a DMRS for AoA measurement. As the arrangement of antenna arrays is larger, the measurement accuracy of the AoA is higher. When the antenna arrays are arranged at the same interval, signals received at adjacent antenna elements may have a constant phase change (phase rotation).

UTDOA (Uplink Time Difference of Arrival): UTDOA is a method of determining the location of a UE by estimating the arrival time of an SRS. When the estimated SRS arrival time is calculated, a serving cell may be used as a reference cell to estimate the location of the UE based on the difference in arrival time from another cell (or BS/TP). In order to implement the UTDOA method, an E-SMLC may indicate the serving cell of a target UE to indicate SRS transmission to the target UE. Further, the E-SMLC may provide a configuration such as whether an SRS is periodic/aperiodic, a bandwidth, and frequency/group/sequence hopping.

Automatic Repeat Request (ARO) for SL Round Trip Time (RTT) Positioning

Legacy LTE/NR data communication systems support ARQ/HARQ operation to improve the reliability of information transmission between UEs or between a UE and a BS. However, legacy LTE/NR positioning systems may not support the ARQ/HARQ operation. To minimize problems such as an increase in the reception error rate of a PRS and positioning signaling and a decrease in the accuracy of PRS-based ToA measurement, which may occur if the channel quality between the BS and UE is poor, a method of transmitting the same positioning signaling and PRS periodically and repeatedly may be applied. Periodic repetitive transmission in such a positioning system may reduce the efficiency of use of channel resources pre-allocated for positioning. If the channel state/quality is consistently poor, it may be difficult to solve the following problems: errors/failures in receiving a PRS and positioning signaling and inaccurate ToA measurement.

In addition, it may also be difficult to solve transmission failure problems, which are caused when the PRS and positioning signaling is not transmitted due to the following issues of the UE: half-duplex and/or power sharing. Accordingly, to effectively solve these problems, methods of operating and managing positioning automatic request retransmission (or positioning automatic repeat request) (P-ARQ) in positioning systems needs to be developed.

Specifically, P-ARQ operation methods for improving the reliability of positioning signaling reception and PRS reception and the accuracy of PRS-based ToA measurement in positioning systems using Uu link and/or SL will be described. Herein, the P-ARQ may include operations and management for positioning signaling retransmission and/or PRS retransmission.

Hereinafter, the definitions of terms related to positioning used herein will be described.

- UE: The term "UE" may include a vehicle, a robot, a mobile device, a device equipped with V2X modules, a road side unit (RSU), an Internet of Things (IoT) device, etc.
- SL positioning: The term "SL positioning" may include SL round trip time (SL-RTT) positioning, SL Time Difference of Arrival (SL-TDoA) positioning, SL Angle of Arrival (SL-AoA) positioning, SL Arrival of Departure (SL-AoD) positioning, etc.
- Positioning signaling: The term "positioning signaling" refers to signaling of information such as resource scheduling and positioning resources required to perform positioning. The positioning signaling may be transmitted in message/data packets or via dedicated positioning signaling.

P-ARQ: The term "P-ARQ" refers to ARQ operation for positioning systems and may include positioning HARQ (P-HARQ) operation for positioning signaling retransmission.

Transmitting UE (Tx-UE: transmit UE): The term "transmitting UE" may include: a UE that transmits a PRS to a BS when RTT or UL-TDoA positioning is performed between the BS and UE; ② a UE that requests a neighboring UE to participate in RTT positioning and transmits a PRS (Tx) (or request PRS) to the neighboring UE for ranging when the RTT positioning is performed between UEs; ③ a UE that transmits a PRS (Tx) to request a neighboring UE to participate in TDoA positioning when the on-demand TDoA positioning is performed between UEs; and ④ a UE that transmits a PRS to a neighboring UE when broadcast TDoA positioning is performed between UEs.

Receiving UE (Rx-UE: receive UE): The term "receiving UE" may include: ① a UE that receives a PRS from a BS when RTT or DL-TDoA positioning is performed between the BS and UE, ② a UE that receives a request to participate in RTT positioning from a neighboring UE and transmits a PRS (Rx) (or response PRS) in response to the PRS (Tx) received from the neighboring UE (requesting to participate in the RTT positioning) for ranging when the RTT positioning is performed between UEs; and ③ a UE that receives a request to participate in TDoA positioning from a neighboring UE and transmits a PRS (Rx) in response to the PRS (Tx) received from the neighboring UE (requesting to participate in the TDoA positioning) When the on-demand TDoA positioning is performed between UEs.

Retransmitting UE (Re-UE: retransmission UE): The term "retransmitting UE" refers to a UE that retransmits a PRS and/or positioning signaling. A transmitting UE or a receiving UE may serve as a retransmitting UE.

Hereinafter, "ARQ for sidelink RTT positioning and blind retransmission" and "automatic request retransmissions for positioning systems" will be described based on the above term definition.

ARQ for SL RTT Positioning and Blind Retransmission

First, P-ARQ operation methods for improving the reliability of positioning signaling reception and SL-PRS (e.g., SL-PRS-Tx or SL-PRS-Rx) reception and the accuracy of SL-PRS-based ToA measurement in RTT positioning systems using SL will be described. Herein, the P-ARQ may include positioning signaling retransmission and/or PRS retransmission.

In addition, P-ARQ operation methods based on channel reciprocity in SL RTT positioning systems are also proposed. In this case, the channel reciprocity may mean that the channel response/status/quality of a transmitting UE are similar or identical to that of a receiving UE when the transmitting UE and receiving UE participate in SL-RTT positioning. In other words, the channel experienced by an SL-PRS-Tx and positioning signaling (Tx) (or a request PRS and request positioning signaling) transmitted by the transmitting UE to the receiving UE may be considered similar or identical to the channel experienced by a SL-PRS-Rx and positioning signaling (Rx) (or a response PRS and response positioning signaling) transmitted by the receiving UE to the transmitting UE. Eventually, P-ARQ based on the channel reciprocity in the SL-RTT positioning process may be operated as a process in which the receiving UE requests retransmission of the SL-PRS-Tx and positioning signaling (Tx), and the transmitting UE retransmits the SL-PRS-Tx and positioning signaling (Tx).

The transmitting UE may not request the receiving UE to retransmit the SL-PRS-Rx and positioning signaling (Rx). That is, when the transmitting UE receives an ACK for the SL-PRS-Tx and positioning signaling (Tx) from the receiving UE, the channel response/status/quality between the transmitting UE and receiving UE may be regarded as good.

Alternatively, the transmission attributes of an SL-PRS-Tx and positioning signaling (Tx) retransmitted by the transmitting UE may be the same as or different from those of a previously transmitted SL-PRS-Tx and positioning signaling (Tx). When the transmission attributes change, the transmitting UE may provide the receiving UE with information on the changes and information on whether the transmission attributes change.

Alternatively, the transmitting UE may calculate/measure an absolute or relative position based on the SL-PRS-Rx and positioning signaling (Rx) received from the receiving UE. If the reliability/accuracy of the measured absolute or relative position does not satisfy a predefined positioning quality indicator (PQI) level, a confidence level, and/or a certain level for determining positioning accuracy, the transmitting UE may perform the SL-RTT positioning process again. Consequently, the process of performing SL-RTT positioning again may be regarded as a process in which the transmitting UE retransmits the SL-PRS-Tx and positioning signaling (Tx) to the receiving UE and requests retransmission of the SL-PRS-Rx and positioning signaling (Rx).

Herein, an SL-PRS-Tx and positioning signaling (Tx) refer to a request PRS and request positioning signaling, and an SL-PRS-Rx and positioning signaling (Rx) refer to a response PRS and response positioning signaling.

Hereinafter, the main operation characteristics related to re-execution of SL-RTT positioning will be described.

For P-ARQ in the process of re-performing SL-RTT positioning, the transmitting UE may transmit information on whether the SL-RTT positioning is re-performed to the receiving UE through signaling. When a request PRS and request positioning signaling received from the transmitting UE are retransmission signals, the receiving UE may perform a signal processing operation such as combining in order to improve reception performance based on a previously received request PRS and request positioning signaling, which are stored in a retransmission buffer.

Hereinafter, the operations of the receiving and transmitting UEs proposed for efficient/effective P-ARQ operation and characteristics thereof will be described.

Operations for the receiving UE to request retransmission and relevant key features:

Considering a case where the receiving UE requests retransmission of a request PRS and request positioning signaling or a case where the transmitting UE requests the receiving UE to re-perform SL-RTT positioning, the receiving UE may store a currently received request PRS and request positioning signaling in a retransmission buffer or delete the currently received request PRS and request positioning signaling from the retransmission buffer. In this case, the request PRS and request positioning signaling stored in the retransmission buffer may be combined with a request PRS and request positioning signaling to be retransmitted in the future to improve reception performance.

Based on the following conditions, the receiving UE may request the transmitting UE to retransmit a request PRS and request positioning signaling.

① When the receiving UE has an error while receiving the request positioning signaling, or when the receiving UE fails to receive the request positioning signaling; ② when the RSRP measurement for the request PRS does not meet a predefined level/threshold, or when the receiving UE fails to receive the request PRS or partially receives the request PRS; and ③ when the receiving UE measures ToA based on the request PRS and the RSRP/SNR/received field strength does not meet a predefined level/threshold, or when the receiving UE determines that the resolution to decompose/analyze a channel multipath is not sufficient due to a small transmission bandwidth of the request PRS.

If at least one of the above conditions (①, ②, and ③) is satisfied, the receiving UE may request the transmitting UE to retransmit the request PRS and request positioning signaling. Specifically, methods of requesting retransmission of a request PRS and request positioning signaling may include a first request method, a second request method, and so on.

The first request method may be a method of requesting retransmission of the request PRS and request positioning signaling based on an ACK/NACK signal. The receiving UE may use the ACK/NACK signal to request the retransmission of the request PRS and request positioning signaling. Specifically, only when the request PRS and request positioning signaling are successfully received, the receiving UE transmits the ACK signal. When the request positioning signaling and/or request PRS are not successfully received, the receiving UE may transmit the NACK signal.

In this case, the receiving UE may use resources pre-reserved/pre-allocated or pre-configured for a physical sidelink feedback channel (PSFCH) to transmit the ACK/NACK signal for the request positioning signaling (or packets carrying the request positioning signaling). Alternatively, when the receiving UE has channel resources pre-reserved/pre-allocated or pre-configured to transmit the request positioning signaling to the transmitting UE, the receiving UE may transmit the ACK/NACK signal over a PSCCH and/or PSSCH (e.g., first stage SCI, 2nd stage SCI, and/or data). Alternatively, when the receiving UE is allowed to transmit the ACK/NACK on both the channel resources for the PSCCH (and/or PSSCH) and the channel resources for the PSFCH, the receiving UE may transmit the ACK/NACK signal on channel resources that are earlier in the time domain.

The second request method may be a method in which the receiving UE requests retransmission of the request PRS and request positioning signaling based on a response PRS. That is, the response PRS transmitted by the receiving UE (in response to a request PRS transmitted from the transmitting UE) may include information for requesting the retransmission of the request PRS and request positioning signaling, similarly to the ACK/NACK. In other words, the response PRS may be operated as an ACK/NACK-related signal.

Specifically, a normal response PRS may perform a function similar to that of an ACK in response to successful reception of a PRS and positioning signaling from the transmitting UE. The reverse response PRS may be generated ① by rearranging the normal response PRS in the reverse order in the time or frequency domain (or reversing the sequence order) or ② by inverting the bits of each symbol constituting the normal response PRS in the time or frequency domain. The reverse response PRS may perform a function similar to that of a NACK, as a response signal for unsuccessful or incomplete reception of a PRS and request positioning signaling from the transmitting UE.

In this case, the reverse response PRS generated by reversing the sequence order of the normal response PRS in the frequency domain may be the same as a reverse response PRS obtained by conjugating the normal response PRS with signals in the time domain. In other words, a correlator based on the reverse response PRS may be implemented and driven with a correlator based on the normal response PRS. On the other hand, the correlation between the normal response PRS and reverse response PRS may be very low.

Since the normal response PRS and/or reverse response PRS is transmitted with a long sequence in a relatively wide frequency band, compared to the ACK/NACK transmitted over the PSFCH. The normal response PRS and/or reverse response PRS may be robust to channel frequency selectivity. In other words, according to the method of transmitting an ACK/NACK with the normal response PRS and/or reverse response PRS, the normal response PRS and/or reverse response PRS may be transmitted with a long sequence in a relatively wide frequency band, compared to the ACK/NACK transmitted over the PSFCH, and thus, it may be robust to the channel frequency selectivity.

According to the above, only when the request PRS and request positioning signaling are received successfully, the receiving UE may transmit the normal response PRS. When the request positioning signaling and/or request PRS are not successfully received, the receiving UE may transmit the reverse response PRS.

The transmitting UE may determine or identify whether the received response PRS is the normal response PRS or the reverse response PRS. In this case, if the response PRS is the normal response PRS, the transmitting UE may perform ranging for SL-RTT positioning. If the response PRS is the reverse response PRS, the transmitting UE may retransmit the request PRS and request positioning signaling.

Alternatively, the transmitting UE may determine or identify whether the received response PRS is the normal response PRS or the reverse response PRS, based on the correlator based on the normal response PRS. Specifically, if a signal of a specific predefined level is detected by the correlator based on the normal response PRS, the transmitting UE may regard the received response PRS as the normal response PRS. If a signal below the specific level is detected, the transmitting UE may regard or determine the received response PRS as the reverse response PRS.

Alternatively, the receiving UE may use a positioning retransmission timer (e.g., time-out) to request the retransmission of the request PRS and request positioning signaling.

Specifically, when the receiving UE fails to receive the request positioning signaling and/or request PRS from the transmitting UE before the time-out, the receiving UE may request the retransmission of the request PRS and request positioning signaling. In this case, the receiving UE may receive channel resource information for the transmitting UE to transmit or (retransmit) the request PRS and also receive request positioning signaling from the transmitting UE or BS/network/LMF in advance. In addition, the receiving UE may transmit the ACK/NACK signal according to the first request method in relation to the positioning retransmission timer. Alternatively, the receiving UE may transmit the response PRS according to the second request method in order to request the retransmission of the request PRS and request positioning signaling.

Alternatively, when the receiving UE knows channel resources pre-reserved/pre-allocated or pre-configured for the transmitting UE to transmit the request PRS and request positioning signaling, the receiving UE may use the channel resources only if the receiving UE successfully receives the request PRS and request positioning signaling from the transmitting UE. Otherwise, the receiving UE may not use the channel resources. In other words, the transmitting UE may consider that the receiving UE requests retransmission if there are no signals (i.e., no response PRS and no response positioning signaling) on channel resources on which the request positioning signaling and PRS from the receiving UE are expected. When the transmitting UE receives no signals (i.e., no response positioning signaling and no response PRS) from the receiving UE on the channel resources where the request PRS and request positioning signaling are expected to be received, the transmitting UE may consider that the receiving UE requests the retransmission.

When the retransmission of the request PRS and positioning signaling is requested according to the above method, the transmitting UE may perform the following operations.

The transmitting UE may store a previously transmitted request PRS and request positioning signaling in a buffer (or retransmission buffer). Based on the retransmission request from the receiving UE, the transmitting UE may perform the retransmission based on the request PRS and request positioning signaling stored in the buffer. Alternatively, the transmitting UE may request the receiving UE to retransmit the response positioning signaling and response PRS in order to re-perform SL-RTT positioning. Alternatively, considering the case where the receiving UE requests the retransmission of the request PRS and request positioning signaling, the transmitting UE may store a currently received response PRS and response positioning signaling in the retransmission buffer. In this case, the response PRS and response positioning signaling stored in the retransmission buffer may be combined with a response PRS and response positioning signaling to be retransmitted in the future and used to improve reception performance.

Alternatively, after detecting the ACK/NACK signal and/or response PRS received from the receiving UE, the transmitting UE may retransmit the request PRS and request positioning signaling. Specifically, when the transmitting UE receives the NACK signal and/or reverse response PRS from the receiving UE, the transmitting UE may retransmit the request PRS and request positioning signaling. In addition, when the transmitting UE intends to perform the retransmission, the transmitting UE may retransmit the request PRS and request signaling previously stored in the retransmission buffer without changing the transmission attributes or transmission parameters for the request PRS and request positioning signaling. Alternatively, the transmitting UE may transmit the request PRS and request positioning signaling by changing the transmission attributes or transmission parameters.

Alternatively, when the transmitting UE receives no response positioning signaling and/or no response PRS from the receiving UE until the expiration of a preconfigured timer (e.g., time-out), the transmitting UE may retransmit the request PRS and request positioning signaling.

Alternatively, when the transmitting UE receives the ACK signal and/or normal response PRS from the receiving UE, the transmitting UE may not perform the retransmission.

Next, methods of applying blind retransmission to retransmission in SL RTT positioning systems described above will be described.

The blind retransmission may be performed when the transmitting UE does not successfully decode or detect an ACK/NACK received from the receiving UE. Specifically, the blind retransmission in the SL RTT positioning retransmission system may be performed as follows.

When the transmitting UE does not successfully decode or detect an ACK/NACK signal and/or (normal/reverse) response PRS received from the receiving UE, the transmitting UE may retransmit an SL-PRS and positioning signaling (or a request PRS and request positioning signaling) based on the transmission attributes of an SL-PRS and positioning signaling that are previously transmitted. When the transmitting UE does not successfully receive an ACK signal from the receiving UE, the blind retransmission may be performed even if the receiving UE successfully receives an SL-PRS and positioning signaling from the transmitting UE. Thus, the blind retransmission may be distinguished from NACK signal-based retransmission.

Hereinafter, specific methods of performing P-ARQ based on the above description will be described in detail.

Automatic Request Retransmissions for Positioning Systems

As described above, the P-ARQ operation methods for improving the reliability of positioning signaling reception and PRS reception and the accuracy of PRS-based ToA measurement may be performed in positioning systems using Uu link and/or SL.

Hereinafter, various positioning system operating scenarios to which P-ARQ is applicable will be described.

First P-ARQ Condition

The first condition may include the following cases: when the channel state/quality between the transmitting UE and the receiving UE or the channel state/quality between the BS and the UE is degraded; when an error occurs in positioning signaling reception due to the presence of a building/area that causes shadowing/blocking; when positioning signaling reception fails; and when reception of an ACK/NACK signal related to positioning signaling fails. When the first P-ARQ condition is satisfied, P-ARQ may be applied. Positioning signaling retransmission may be operated in the same or similar way as data retransmission.

Second P-ARQ Condition

The second P-ARQ condition may include: when the channel state/quality between the transmitting UE and the receiving UE or the channel state/quality between the BS and the UE is degraded; when the RSRP measurement for a PRS does not meet a predefined level/threshold due to the presence of a building/area that causes shadowing/blocking; when PRS reception fails or is partially received; and when reception of an ACK/NACK signal related to a PRS fails. When the second condition is satisfied, P-ARQ may be applied.

Specifically, for a UL-TDoA or multi-cell RTT positioning process between the BS and UE, when RSRP measured by the BS for a PRS received from the UE does not meet a specific level/threshold, or when the PRS reception is incomplete (for example, when a PRS is partially received due to the occurrence of a deep null phenomenon at a specific frequency of a channel, or when the PRS is blocked by a building/area that causes shadowing/blocking), the BS may request the UE to retransmit the PRS.

Alternatively, for a DL-TDoA or multi-cell RTT positioning process between the BS and UE, when RSRP measured by the UE for a PRS received from the BS does not meet a specific level/threshold, or when the PRS reception is not complete, the UE may request the BS to retransmit the PRS similarly to the above. In this case, the UE may request all BSs participating in the positioning to retransmit the PRS. Alternatively, the UE may request only the BS that does not satisfy the RSRP threshold to retransmit the PRS.

Alternatively, for an SL TDoA or RTT positioning process between the transmitting UE and receiving UE (SL TDoA may be performed similarly to UL-TDoA between the BS and UE), when RSRP measured by the receiving UE for a PRS (e.g., a request PRS requesting transmission of a response PRS) received from the transmitting UE does not satisfy a specific level/threshold, or when the PRS reception is incomplete, the receiving UE may request the transmitting UE to retransmit the PRS.

Alternatively, similar to the above, for an SL TDoA or RTT positioning process between the transmitting UE and receiving UE (SL TDoA may be performed similarly to DL-TDoA between the BS and UE), when RSRP measured by the transmitting UE for a PRS (e.g., a response PRS transmitted in response to a request PRS) received from the receiving UE does not satisfy a specific level/threshold, or when the PRS reception is incomplete, the transmitting UE may request the receiving UE to retransmit the PRS.

Third P-ARQ Condition

The third condition may include: when the reliability/accuracy of an absolute or relative position measured by the UE or BS does not satisfy a predefined PQI level, a confidence level, and/or a certain level for determining positioning accuracy. In this case, P-ARQ may be applied.

Specifically, for a UL-TDoA positioning process between the BS and UE, when the reliability/accuracy of the absolute position of the UE measured by the network/LMF does not satisfy a specific level, the BS/network/LMF may request the UE to retransmit a PRS and/or assistance information.

Alternatively, for a DL-TDoA positioning process between the BS and UE, when the reliability/accuracy of the absolute position of the UE measured by the network/LMF or the UE (in the case of UE-based positioning) does not satisfy a specific level, the network/LMF/UE may request the BS to retransmit a PRS and/or assistance information.

Alternatively, for an SL TDoA operation process between the transmitting UE and receiving UE (SL TDoA may be performed similarly to DL-TDoA between the BS and UE), when the reliability/accuracy of a measured absolute position does not satisfy a specific level, the receiving UE may request the transmitting UE to retransmit a PRS and/or assistance information.

Alternatively, for an SL RTT operation process between the transmitting UE and receiving UE, when the reliability/accuracy of a measured absolute or relative position does not satisfy a specific level, the transmitting UE may request the receiving UE to retransmit a response PRS (PRS-RX) and/or assistance information. Alternatively, the transmitting UE may request the receiving UE to retransmit the response PRS (PRS-RX) by transmitting a request PRS (PRS-TX).

The Fourth P-ARQ Condition

The fourth P-ARQ condition may include: when the UE or BS measures ToA based on a PRS and when the RSRP/SNR/received field strength does not meet a predefined level/threshold; and when it is determined that the resolution to decompose/analyze a channel multipath is insufficient due to a small PRS transmission bandwidth. In this case, a plurality of reception times may be measured by the multipath for the request PRS.

In this case, the resolution for decomposing/analyzing the channel multipath may be improved by increasing the PRS transmission bandwidth in licensed bands or by retransmitting the PRS in wide unlicensed bands. In other words, when P-ARQ is performed according to the fourth P-ARQ condition, the UE or BS may retransmit the PRS by increasing the transmission bandwidth in which the PRS is transmitted. Alternatively, the resolution for decomposing/analyzing the channel multipath may be improved by increasing the number of times that the PRS retransmission is repeated.

The fourth P-ARQ condition may be the same as or similar to embodiments for PRS retransmission according to the above-described conditions.

Hereinafter, ACK/NACK signal operation methods related to positioning in systems for positioning signaling and PRS retransmission and signaling related to the retransmission (or channel resources on which the retransmission is performed) will be described.

First ACK/NACK Signal Operation Method

Herein, ACK/NACK signals may be categorized into an ACK/NACK signal related to positioning signaling and an ACK/NACK signal related to a PRS, and these ACK/NACK signals may be separately operated.

The UE may transmit an ACK signal for positioning signaling (ACK-s) when the positioning signaling is received without any errors. When RSRP measured for a PRS does not meet a specific predefined threshold level, when the reliability/accuracy of a measured relative/absolute position does not satisfy a predefined specific PQI level, and/or when ToA is measured based on the PRS and when the resolution to decompose/analyze a channel multipath is determined to be insufficient (that is, when the first P-ARQ condition, second P-ARQ condition, third P-ARQ condition, and/or fourth P-ARQ condition described above are satisfied), the UE may transmit a NACK signal for the PRS (NACK-p).

Alternatively, the BS or the retransmitting UE may retransmit only a signal of which retransmission is requested among the positioning signaling and the PRS. For example, when the BS or retransmitting UE receives a NACK-s for the positioning signaling and an ACK-p for the PRS, the BS or retransmitting UE may retransmit only the positioning signaling.

Alternatively, when the BS or retransmitting UE receives the NACK-s for the positioning signaling, the BS or retransmitting UE may retransmit the positioning signaling and PRS at the same time. In other words, when the NACK-s is received for the positioning signaling, the BS or retransmitting UE may retransmit both the positioning signaling and the corresponding PRS, regardless of an ACK/NACK for the PRS. For example, when the BS and/or retransmitting UE fails to receive the positioning signaling or has an error (i.e., NACK) in receiving the positioning signaling, the BS and/or retransmitting UE may determine that the accuracy/reliability of PRS scheduling-related information is degraded and retransmit the PRS together, regardless of the ACK-p/NACK-p signal for the PRS. In other words, if the NACK for the positioning signaling is received, it may be expected that the quality of the PRS received based on the positioning signaling, which is not correctly received, may be degraded or errors may occur in the PRS reception. Thus, the BS and/or retransmitting UE may also retransmit the corresponding PRS after retransmitting the positioning signaling.

The ACK/NACK operation method and retransmission method proposed herein may increase the efficiency of use of channel resources pre-allocated for positioning. The proposed ACK/NACK operation method and retransmission method may be effectively applied to TDoA positioning such as DL-TDoA, UL-TDoA, and SL TDoA.

Second ACK/NACK Signal Operation Method

Alternatively, ACK/NACK signals may not be categorized into an ACK/NACK signal related to positioning signaling and an ACK/NACK signal related to a PRS.

Specifically, the UE may transmit an ACK signal if positioning signaling is received without errors. When RSRP measured for a PRS satisfies a specific predefined threshold level; when the reliability/accuracy of a measured relative/absolute position satisfies a predefined specific PQI level; and when ToA is measured based on the PRS and the resolution to decompose/analyze the multipath of a channel is sufficient, that is, only when both conditions for transmitting an ACK signal for positioning signaling and conditions for transmitting an ACK signal for a PRS are satisfied, the UE may transmit the ACK signal.

On the other hand, when at least one of the above conditions is not satisfied, the UE may transmit a NACK. Specifically, when an error occurs in receiving the positioning signaling, when RSRP measured for a PRS does not satisfy a predefined threshold level, when the reliability/accuracy of a measured relative/absolute position does not satisfy a predefined PQI level, and when ToA is measured based on the PRS and the resolution to decompose/analyze the multipath of a channel is determined to be insufficient, the UE may transmit the NACK signal.

In other words, when any one of the received positioning signaling and PRS has an error (first NACK condition), when the RSRP measured for the PRS is below the specific predefined threshold level (second NACK condition), when the reliability/accuracy of the measured relative/absolute position is below the predefined specific PQI level (third NACK condition), and/or when ToA is measured based on the PRS and the resolution for decomposing/analyzing the multipath of the channel is less than predetermined resolution (fourth NACK condition), the UE may transmit the NACK in relation to positioning. Alternatively, when the positioning signaling and PRS do not satisfy all of the first NACK condition, the second NACK condition, the third NACK condition, and the fourth NACK condition, the UE may transmit the ACK in relation to the positioning.

Alternatively, when the BS or retransmitting UE receives a NACK signal based on any one of the first operation method and the second operation method, the BS or retransmitting UE may retransmit a PRS and positioning signaling.

The proposed first and second operation methods and retransmission methods related thereto may provide excellent positioning performance when the UE moves at a high speed or when the channel state changes quickly. In addition, the methods may be effectively applied to RTT positioning.

Alternatively, for ACK/NACK operation related to positioning signaling and ACK/NACK operation related to a PRS, if the BS or UE does not receive an ACK/NACK signal within a predefined retransmission duration (e.g., time-out) after transmitting a PRS and positioning signaling, the BS or UE may assume a NACK signal and then retransmit the positioning signaling and PRS. For example, when the BS or UE transmits a PRS and positioning signaling related to first positioning, and when the BS or UE receives no ACK/NACK signal for a predetermined time from the time of transmitting the PRS, the BS or UE may consider that a NACK is received for the first positioning.

Alternatively, the failure (or error reception) or success (or complete reception) in receiving the positioning signaling and PRS may be detected or determined by a retransmission timer, an ACK/NACK transmitted from the receiving UE, and/or polling.

Next, methods of defining and transmitting a signal and signaling for retransmission will be described.

In positioning systems using Uu link such as DL/UL, an ACK/NACK signal for a PRS and positioning signaling may be transmitted over a PCFICH, DCI on a PDCCH, a PDSCH, a PUCCH, and/or a PUSCH.

Alternatively, in positioning systems using SL, an ACK/NACK signal for a PRS and positioning signaling may be transmitted along with data over a PSFCH, first stage SCI on a PSCCH, second stage SCI on a PSSCH, and/or a PSSCH. In this case, transmission of the ACK/NACK signal over the PSFCH may be operated similarly or identically to the HARQ transmission method, SL HARQ process, etc. defined in the current NR-V2X system.

Alternatively, for the RTT positioning process, if the accuracy/reliability of the absolute or relative position of the UE measured by the transmitting UE does not satisfy a specific level, the execution of RTT positioning may be requested again. In this case, the transmitting UE may retransmit a request PRS and positioning signaling to the receiving UE, and the receiving UE may retransmit a response PRS (or PRS-RX) and positioning signaling in response thereto. That is, the positioning signaling and/or request PRS (or PRS-TX) that the transmitting UE retransmits to the receiving UE may perform the same role as a NACK signal.

Alternatively, as described above, the receiving UE may request retransmission of the request PRS (NACK) by transmitting the response PRS with a PRS pattern corresponding to ACK/NACK.

Alternatively, when the BS/network/LMF or UE requests retransmission of a PRS, the BS/network/LMF or UE may additionally transmit additional information to the retransmitting UE or BS/network/LMF to improve the reception performance for the retransmission. The additional information may include RSRP measured for the received PRS, the reliability/accuracy of a measured relative/absolute position, resolution-related information required to decompose/analyze the multipath of a channel when ToA is measured based on the PRS, and requirements for improving resolution performance (e.g., a bandwidth for the PRS retransmission, the number of times that the PRS retransmission is performed, etc.).

In positioning system using Uu link such as DL/UL, the additional information (or retransmission information) may be transmitted over DCI on a PDCCH, a PDSCH, a PUCCH, and/or a PUSCH. Alternatively, in positioning systems using SL, the additional information may be transmitted together with first stage SCI on a PSCCH, second stage SCI piggybacked on a PSSCH, and/or data.

Alternatively, the maximum number of times that a PRS and positioning signaling is retransmitted may be determined by the BS/network/LMF or predefined. In positioning systems using Uu link such as DL/UL, the maximum number of times of retransmission may be transmitted in a system information block (SIB), DCI on a PDCCH, a PDSCH, a PUCCH, and/or a PUSCH. In positioning system using SL, the maximum number of times of retransmission may be transmitted together with first stage SCI on a PSCCH, second stage SCI piggybacked on a PSSCH, and/or data.

Alternatively, when the BS or retransmitting UE retransmits a new PRS and/or positioning signaling that is different from a previously transmitted PRS and positioning signaling, the BS or retransmitting UE may signal information (or change information) related to transmission of the new positioning signaling and/or PRS with one bit as follows.

New Signaling Indicator Bit (NSIB): When one bit is toggled, it may mean or indicate that new positioning signaling is transmitted. When the one bit is not toggled, it may mean or indicate that the same positioning signaling is retransmitted. For example, when the BS or retransmitting UE changes the code rate, transmission modulation, etc. (i.e., transmission parameters) of positioning signaling or assistance information for supporting positioning, the NSIB may be toggled.

New PRS Indicator Bit (NPIB): When one bit is toggled, it may mean that a new PRS is transmitted. If the one bit is not toggled, it may indicate that the same PRS is retransmitted. For example, the BS or retransmitting UE may change the PRS retransmission bandwidth and/or the number of times that PRS retransmission is repeated to improve the performance of PRS reception and the performance of PRS-based ranging, and in this case, the NPIB may be toggled.

In the P-ARQ system, the BS or UE may operate a P-ARQ ID for positioning signaling (P-ARQ-s ID) and a P-ARQ ID for PRS (P-ARQ-p ID). In particular, the above P-ARQ ID operation may be effectively applied to perform the RTT positioning process between the transmitting UE and receiving UE or between the UE and BS. Hereinafter, related embodiments will be described.

Specifically, when one transmitting UE simultaneously performs independent/separate ranging with multiple receiving UEs in the RTT positioning process using SL, the transmitting UE may transmit the same or different P-ARQ-s ID and P-ARQ-p ID to each receiving UE, and each receiving UE may perform the P-ARQ procedure with the transmitting UE based on the received P-ARQ ID. This P-ARQ ID operation may be similarly or equally applied to positioning process between the BS and UE based on Uu link. For the positioning process based on Uu link, information on a PRS retransmission ID may be transmitted in DCI of a PDCCH, a PDSCH, a PUCCH, and/or a PUSCH. For the SL positioning process, information on a PRS retransmission ID may be transmitted together with first stage SCI on a PSCCH, second stage SCI on a PSSCH, and/or data.

In the following, methods of transmitting only a NACK signal without transmitting an ACK signal in systems for positioning signaling and PRS retransmission will be described.

The UE may not transmit an ACK-s signal when positioning signaling is received without errors. The UE may transmit a NACK-s signal only when an error occurs. Alternatively, the UE may not transmit an ACK-p signal when a PRS is successfully received. The UE may transmit a NACK-p signal only when a PRS is not completely received. Alternatively, the above-described retransmission timeout method may not be applied to systems where only a NACK signal is transmitted. In this case, the method of transmitting only a NACK signal may save channel resources for ACK transmission, compared to the ACK/NACK signal operation method described above. As a result, collisions between NACK signals that may occur as the number of UEs increases may be minimized.

Hereinafter, methods for a retransmitting UE to retransmit a PRS and/or positioning signaling upon receiving a NACK related to positioning will be described in detail.

Retransmission of Positioning Signaling in V2X Message

Positioning signaling may be retransmitted in V2X message packets or independent positioning-dedicated packets, which are different from the V2X message packets. Cases in which positioning signaling is retransmitted in V2X message packets will first be described.

Retransmission of positioning signaling in V2X message packets may include a case of using packets for a previously reserved V2X message if there is a channel for the V2X message. Specifically, if the retransmitting UE has periodic/aperiodic channel resources pre-reserved for V2X message transmission, the retransmitting UE may retransmit positioning signaling in V2X message packets on the reserved channel resources.

In this case, the transmitting UE may provide the receiving UE with information on reserved channel resources such as a PSCCH+PSSCH and a PSFCH available for positioning signaling retransmission. In other words, the retransmitting UE may provide a peer UE with information on the location of a resource on an SL channel on which positioning signaling is retransmitted in V2X message packets.

Alternatively, when positioning signaling is retransmitted in V2X message packets, the retransmitting UE may inform a peer or neighboring UE whether the positioning signaling is included in the V2X message packets by including a one-bit indicator indicating whether the positioning signaling is included in the V2X message packets. In addition, the retransmitting UE may provide information on a location where the positioning signaling is located within channel resources (or within the V2X message packets), thereby preventing a UE supposed to receive V2X messages from decoding the positioning signaling and allowing only a UE that requests retransmission to decode the retransmitted positioning signaling. In other words, the transmitting UE may specify a UE to decode positioning signaling included in a specific resource location through the indicator.

Retransmission of Positioning Signaling in Positioning Packets

Even though the retransmitting UE has periodic/aperiodic channel resources pre-reserved for V2X message transmission, if there are not enough channel resources for positioning signaling transmission, the retransmitting UE may randomly select new channel resources or periodically/aperiodically reserve multiple channel resources in order to retransmit the positioning signaling.

Specifically, when the retransmitting UE has no channel resources pre-reserved for V2X message transmission, the retransmitting UE may retransmit the positioning signaling by randomly selecting new channel resources or periodically/aperiodically reserving multiple channel resources.

When the retransmitting UE periodically/aperiodically reserves multiple channel resources, if there are remaining channel resources after retransmission between transmitting and receiving UEs is successfully completed, the remaining channel resources may be used by other UEs. In this case, a neighboring UE may monitor an ACK/NACK to determine whether to use the channel resources for positioning packet transmission. In other words, the retransmitting UE may pre-reserve channel resources to retransmit the positioning signaling. If the neighboring UE detects an ACK for positioning related to the retransmitting UE or detects no NACK, the neighboring UE may transmit positioning signaling related to its own positioning or retransmit the positioning signaling on the pre-reserved resources.

Channel on which PRS Retransmission is Performed

The retransmitting UE may perform PRS retransmission based on periodic/aperiodic channel resource reservation in a licensed band. The retransmitting UE may pre-reserve channel resources periodically/aperiodically for the PRS retransmission, and the reservation information may be transmitted to the requesting UE requesting the retransmission through positioning signaling transmitted in the licensed band. In other words, the retransmitting UE may reserve or schedule channel resources to retransmit a PRS in advance, and positioning signaling related to the PRS may include information on the channel resources for the retransmission.

Alternatively, the retransmitting UE may perform PRS retransmission by performing a contention-based channel resource acquisition process in an unlicensed band. Specifically, the retransmitting UE may acquire channel resources by competing with neighboring UEs through a back-off process in the unlicensed band and then transmit or retransmit a PRS on the acquired channel resources.

Alternatively, the retransmitting UE may transmit information on PRS retransmission in an unlicensed band through positioning signaling transmitted in the licensed band. In this case, the information on the PRS retransmission may include at least one of information on channel resources in the unlicensed band, a one-bit indicator indicating whether the channel resources in the unlicensed band are resources for the PRS retransmission, the frequency band and frequency bandwidth for the PRS retransmission, or the ID and/or pattern of the retransmitted PRS.

The requesting UE requesting the retransmission may transmit an ACK/NACK signal for the PRS to the retransmitting UE on pre-allocated or pre-reserved channel resources in the licensed band.

Hereinafter, methods of configuring a PRS and positioning signaling to be retransmitted by a retransmitting UE will be described in detail.

The retransmitting UE may apply at least one of a first P-ARQ type and a second P-ARQ type to configure the PRS and positioning signaling to be retransmitted.

1) First P-ARQ Type

According to the first P-ARQ, the BS or retransmitting UE may retransmit a PRS and positioning signaling without changing transmission attributes or transmission parameters.

Specifically, when the BS or retransmitting UE receives a NACK signal for the transmitted PRS and positioning signaling, when the BS or retransmitting UE receives no ACK/NACK signal within a retransmission time, or when the BS or retransmitting UE fails to receive a signal (e.g., a response PRS, positioning signaling for the response PRS, etc.) in response to a request PRS and positioning signaling transmitted within the retransmission time, the BS or retransmitting UE may retransmit the PRS and positioning signaling without changing transmission attributes. In this case, the retransmitted positioning signaling and PRS may have the following characteristics.

The transmission attributes of the retransmitted PRS and positioning signaling may be the same as those of the previously transmitted PRS and positioning signaling. In this case, the transmission attributes may include parameters such as a channel coding rate, a modulation order, a PRS transmission bandwidth, a channel resource pattern for PRS transmission, and a PRS pattern. Alternatively, the BS or UE may retransmit the previously transmitted PRS and positioning signaling stored in a retransmission buffer. In other words, the retransmitting UE and/or BS may regenerate and transmit a PRS and positioning signaling having the same transmission attributes, or the retransmitting UE and/or BS may retransmit the PRS and positioning signaling stored in the retransmission buffer as it is without regenerating any PRS and positioning signaling.

Alternatively, the BS or UE may retransmit newly formed positioning signaling without changing the transmission attributes. In other words, the BS or retransmitting UE may retransmit positioning signaling including changed data while maintaining the current transmission attributes or transmission parameters.

Specifically, when positioning-related assistance information transmitted by the BS or retransmitting UE is changed, the BS or retransmitting UE may retransmit positioning signaling including changes based on the changed assistance information. In this case, whether or not the assistance information is changed and/or the positioning signaling is changed may be provided to the requesting UE through NSIB signaling described above. For example, when a UE moving at a high speed participates in positioning for measuring the absolute or relative position as an anchor, the absolute position of the UE (or retransmitting UE) related to the assistance information may change. In this case, the retransmitting UE may transmit (or transmit in advance) NSIB signaling to notify that the assistance information is changed or that the data included in the positioning signaling is changed.

The proposed first P-ARQ type may be effectively applied when the channel state/quality between the transmitting and receiving UEs (or between the BS and the UE) is temporarily degraded.

2) Second P-ARQ Type

The BS or retransmitting UE may retransmit (or transmit) a PRS and positioning signaling by changing the transmission parameters or transmission attributes of the PRS and positioning signaling to be retransmitted.

Specifically, when the BS or retransmitting UE receives a NACK signal for the transmitted PRS and positioning signaling, when the BS or retransmitting UE receives no ACK/NACK signal within a retransmission time, or when the BS or retransmitting UE fails to receive a signal in response to a PRS and positioning signaling transmitted within the retransmission time, the BS or retransmitting UE may retransmit PRS and positioning signaling with changed transmission attributes.

The second P-ARQ type may be performed based on at least one of a first attribute change method and a second attribute change method.

First Attribute Change Method

For transmission parameters for retransmission of the first attribute change method, a subset of transmission parameters may be preconfigured or predefined depending on the number of times of retransmission.

Specifically, positioning signaling may be retransmitted based on a subset of transmission parameters, which is configured/defined differently for each retransmission. In this case, the subset of transmission parameters for the positioning signaling may be preconfigured in relation to the channel code rate, error detection bit, position of redundancy bits, and modulation order. In other words, the retransmitting UE or BS may retransmit the positioning signaling by changing the values of at least two transmission parameters (i.e., transmission parameter subset) among the channel code rate, error detection bit, position of redundancy bits, and modulation order depending on the number of times of retransmission.

For example, the retransmitting UE or BS may preconfigure one or more transmission parameter subsets by increasing the redundancy bits or decreasing the modulation order to improve the performance of error detection and error correction whenever the number of times of retransmission increases.

A PRS may be retransmitted based on a subset of transmission parameters differently configured/defined for each retransmission. In this case, the subset of transmission parameters for the PRS may be preconfigured in relation to the number of times that the PRS is repeatedly transmitted in succession, the frequency bandwidth for PRS transmission (or the number of subcarriers), the frequency band for PRS transmission (or the location where the PRS is transmitted on the same carrier), the channel resource pattern or PRS pattern for PRS transmission, PRS attributes, the frequency bands for PRS transmission (e.g., licensed band, unlicensed band), etc. For example, the retransmitting UE or BS may preconfigure one or more transmission parameter subsets by increasing the transmission frequency band of the PRS or increasing the number of times that the PRS is repeatedly transmitted to improve the accuracy of RSRP for the PRS or ToA measurement based on the PRS for each retransmission.

Second Attribute Change Method

According to the second attribute change method, a PRS and positioning signaling may be retransmitted according to transmission parameters determined based on additional information such as the channel state and reception error rate.

The transmission parameters for retransmission may be adaptively changed based on the additional information related to the retransmission, which is provided by the UE that requests the retransmission. Specifically, the positioning signaling may be retransmitted based on transmission parameters, which are derived based on information (or additional information) such as the CQI, RSSI, and reception error rate measured for a channel by the retransmission requesting UE. In this case, the transmission parameters may include parameters or parameter subsets similar to or identical to those of the first attribute change method.

Alternatively, the PRS may be retransmitted based on transmission parameters, which are derived based on RSRP for the PRS measured by the retransmission requesting UE, a performance indicator indicating the accuracy of ToA measured based on the PRS, information such as PQI for absolute/relative position (or additional information), etc. In this case, the transmission parameters may include parameters or parameter subsets similar to or identical to those of the first attribute change method.

The above-described second P-ARQ type may be effectively applied when the channel condition/quality between the transmitting and receiving UEs or between the BS and UE is consistently poor. In other words, the retransmitting UE may retransmit the PRS and positioning signaling based on any one of the first P-ARQ type and the second P-ARQ type depending on whether the channel state or quality is continuously degraded.

Hereinabove, the P-ARQ operation methods to improve the accuracy of PRS-based ToA measurement and the reliability of positioning signaling reception and PRS reception in positioning systems using Uu Link and/or SL, which did not exist in the legacy LTE/NR system, have been described.

According to the proposed P-ARQ operation methods for the positioning system, 1) inefficient use of channel resources caused by periodic repetitive transmission of the same PRS and positioning signaling, which is observed in the legacy LTE/NR positioning system, may be solved and minimized, or 2) the occurrence of errors/failures in receiving a PRS and positioning signaling and inaccurate ToA measurement, which may continuously occur when the channel state/quality is continuously poor, may be effectively solved. In addition, the proposed P-ARQ methods may be suitably applied to aperiodic resources.

Figure 11:
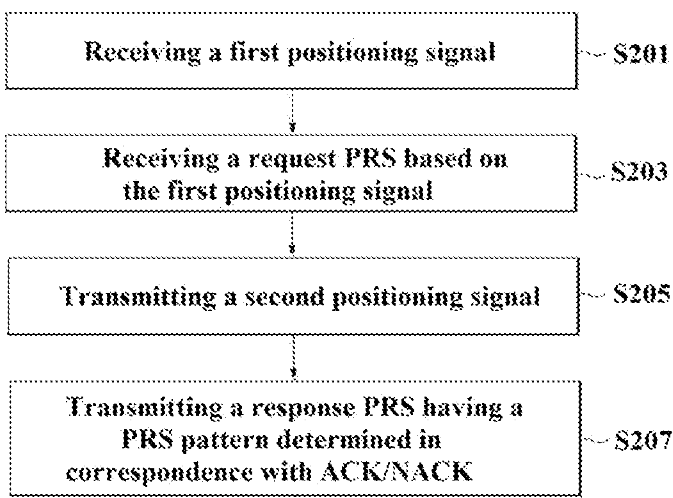
FIG. 11 is a diagram for explaining a method by which a first UE transmits a response positioning reference signal (PRS) in response to a received request PRS.

FIG. 11 is a diagram for explaining a method by which a first UE transmits a response PRS in response to a received request PRS.

Referring to FIG. 11, the first UE may receive a first positioning signal from a second UE (S201). The first positioning signal may correspond to signaling of resource scheduling and positioning resources necessary for positioning. The first positioning signal may include scheduling information on a request PRS such as a positioning type (RTT, TDoA, AOA, etc.), a PQI, the reliability of an absolute position, allocation of channel resources, transmission parameters (e.g., a channel coding rate, a modulation order, a PRS transmission bandwidth, a channel resource pattern and PRS pattern for PRS transmission, etc.), and so on. Alternatively, the first positioning information may include not only the scheduling information on the request PRS but also scheduling information on the response PRS in response to the request PRS.

The first positioning signal may be received over a PSCCH including first SL control information or a PSSCH on which second SL control information is piggybacked.

Next, the first UE may receive the request PRS based on scheduling information included in the first positioning signal (S203). The first UE may obtain or measure related positioning information (related to RTT, TDoA, AoA, etc.) based on the PRS pattern, reception time, and the like of the received request PRS. The first UE may transmit the response PRS in response to the reception of the request PRS.

The first UE may not properly receive the first positioning signal and/or the request PRS. Even if the first UE properly receives the request PRS, the quality of the request PRS may be very low so that the first UE is incapable of measuring or estimating information related to positioning. For example, as described above, the first UE may determine that reception of the positioning signaling and/or the request PRS fails in the following cases: a case in which there is an error in positioning signaling (first NACK condition), a case in which RSRP measured for a PRS is below a specific predefined threshold level (second NACK condition), a case in which the reliability/accuracy of a measured relative/absolute position is below a specific predefined PQI level (third NACK condition), and/or a case in which when ToA is measured based on a PRS, the resolution for decomposing/analyzing the multipath of a channel is less than predetermined resolution (for example, a case in which a plurality of reception times of the request PRS are measured by the resolution) (fourth NACK condition).

In this case, the first UE may transmit or provide ACK/NACK information to the second UE, which is the peer UE, in the request PRS. Details thereof will be described later.

The first UE may transmit a second positioning signal scheduling the response PRS in response to the request PRS (S205). The first UE may transmit the response PRS based on scheduling information included in the second positioning signal (S207). The response PRS may be a PRS for the second UE to obtain positioning information. The response PRS may be transmitted on channel resources for the response PRS in a PRS pattern according to the second positioning signal. Alternatively, the response PRS may be transmitted to the second UE in a PRS pattern allocated by the first positioning signal.

As described above, the response PRS may include ACK/NACK information related to the success or failure in receiving the request PRS.

Specifically, the first UE may transmit the response PRS including the ACK/NACK information based on a relationship with a PRS pattern related to the second positioning signal (or first positioning signal). That is, the first UE may transmit the ACK/NACK information to the second UE based on the PRS pattern of the response PRS.

Specifically, when the first UE fails to receive the request PRS (or first positioning signal) due to at least one of the NACK conditions, the first UE may determine a response PRS pattern to be different from that included in the second positioning signal. For example, the first UE may obtain a second PRS pattern by inverting a first PRS pattern included in the second positioning signal in the frequency or time domain and then transmit the response PRS in the second pattern (i.e., reverse response PRS). When the second UE detects that the response PRS is transmitted in a PRS pattern different from that based on the second positioning signal, the second UE may recognize that a NACK situation occurs for the request PRS and retransmit the first positioning signal and/or request RPS.

Alternatively, when the first positioning signal further includes allocation information on a PRS pattern for the response PRS, the first UE may transmit the response PRS in a PRS pattern obtained by inverting the PRS pattern allocated by the first positioning signal in the time or frequency domain. That is, the first UE may intentionally invert the PRS pattern based on the positioning signal in the frequency or time domain and then transmit the response PRS with the inverted PRS pattern to inform the peer UE that a NACK situation occurs.

Alternatively, when the first UE correctly receives the first positioning signal and/or request PRS (i.e., when all the NACK conditions are not satisfied), the first UE may transmit the response PRS in a PRS pattern corresponding to that included in the second positioning signal (or first positioning signal). In this case, the second UE may recognize that the request PRS and/or first positioning signal are correctly received by confirming that the response PRS has the same PRS pattern as that of the second positioning signal.

Alternatively, in relation to the third NACK condition, if the difference between the reliability of a PQI or absolute position for the second UE included in the first positioning signal and the reliability of a PQI or absolute position calculated based on the request PRS is outside a preconfigured error range, the first UE may determine that retransmission of the request PRS is necessary. In this case, the first UE may transmit the response PRS in the second PRS pattern, which is obtained by inverting the first PRS pattern included in the second positioning signal.

Alternatively, in relation to the fourth NACK condition, if the first UE correctly receives the request PRS, but if the first UE is incapable of specifying the time of receiving the request PRS (i.e., when a plurality of reception times are calculated by a multipath, etc.), the first UE may transmit the response PRS in a PRS pattern related to a NACK (i.e., the second PRS pattern) to request the retransmission of the request PRS.

As described above, the first UE may transmit the response PRS in the second PRS pattern (which is different from the first PRS pattern allocated by the first or second positioning signal) to provide NACK information to the second UE. In addition, the first UE may receive the first positioning signal and/or request PRS retransmitted from the second UE.

In conclusion, the first UE may perform the above-described various P-ARQ operations (e.g., automatic request retransmissions for positioning systems, ARQ for sidelink RTT positioning and blind retransmission, etc.) and transmit ACK/NACK information related to the various P-ARQ operations to the peer UE in the response PRS.

Figure 12:
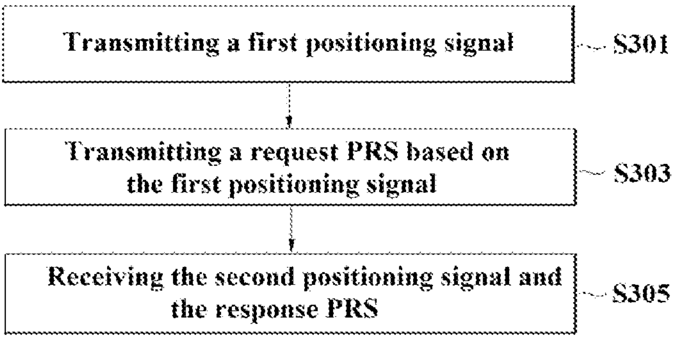
FIG. 12 is a diagram for explaining a method by which a second UE receives a response PRS.

FIG. 12 is a diagram for explaining a method by which a second UE receives a response PRS.

Referring to FIG. 12, the second UE may transmit a first positioning signal to a first UE (S301). The first positioning signal may correspond to signaling of resource scheduling and positioning resources necessary for positioning. The first positioning signal may include scheduling information on a request PRS such as a positioning type (RTT, TDoA, AOA, etc.), a PQI, the reliability of an absolute position, allocation of channel resources, transmission parameters (e.g., a channel coding rate, a modulation order, a PRS transmission bandwidth, a channel resource pattern and PRS pattern for PRS transmission, etc.), and so on. Alternatively, the first positioning information may include not only the scheduling information on the request PRS but also scheduling information on the response PRS in response to the request PRS.

The first positioning signal may be received over a PSCCH including first SL control information or a PSSCH on which second SL control information is piggybacked. In addition, the first positioning signal may be transmitted in V2X message packets or separately configured positioning packets in a licensed and/or unlicensed band as described above.

Then, the second UE may transmit the request PRS based on the scheduling information included in the first positioning signal (S303). The second UE may transmit the request PRS to acquire positioning information (related to RTT, TDoA, AoA, etc.) measured by the first UE based on the request PRS from the first UE.

The second UE may receive a second positioning signal scheduling the response PRS in response to the request PRS and then receive the response PRS, which is transmitted by the first UE, based on the second positioning signal. Alternatively, when the first positioning signal includes the scheduling information on the response PRS, the second UE may receive the response PRS based on the scheduling information on the response PRS included in the first positioning signal. In this case, the second positioning signal may include positioning information measured based on the request PRS and may not include the scheduling information on the response PRS.

The first positioning signal and/or request PRS may be received by the first UE without satisfying the quality for positioning. For example, as described above, cases in which the quality for positioning is not satisfied may include a case in which there is an error in positioning signaling (first NACK condition), a case in which RSRP measured for a PRS is below a specific predefined threshold level (second NACK condition), a case in which the reliability/accuracy of a measured relative/absolute position is below a specific predefined PQI level (third NACK condition), and/or a case in which when ToA is measured based on a PRS, the resolution for decomposing/analyzing the multipath of a channel is less than predetermined resolution (for example, a case in which a plurality of reception times of the request PRS are measured by the resolution) (fourth NACK condition).

In this case, the second UE may recognize or acquire NACK information for the first positioning signal and/or request PRS based on a PRS pattern of the response PRS transmitted from the first UE.

The second UE may receive the second positioning signal scheduling the response PRS in response to the request PRS and then receive the response PRS based on the scheduling information included in the second positioning signal (S305). In this case, the second UE may measure or estimate positioning-related information from the response PRS. In addition, the second UE may obtain ACK or NACK information from the response PRS by comparing the PRS pattern of the response PRS with a PRS pattern scheduled in the second positioning signal.

Specifically, when the first UE fails to receive the request PRS (or first positioning signal) due to at least one of the NACK conditions, the second UE may receive the response PRS with a PRS pattern different from that included in the second positioning signal. For example, the first UE may obtain a second PRS pattern by inverting a first PRS pattern included in the second positioning signal in the frequency or time domain and then transmit the response PRS in the second pattern (i.e., reverse response PRS). When the second UE detects that the response PRS is transmitted in a PRS pattern different from that based on the second positioning signal, the second UE may recognize that a NACK situation occurs for the request PRS and retransmit the first positioning signal and/or request RPS. Alternatively, when the correlation or correlation value of the response PRS in a correlator for the scheduled PRS pattern is significantly low (or less than a predetermined threshold), the second UE may determine that the response PRS has a PRS pattern related to the NACK.

Alternatively, when the first UE correctly receives the first positioning signal and/or request PRS (i.e., when all the NACK conditions are not satisfied), the second UE may receive the response PRS transmitted in a PRS pattern corresponding to that included in the second positioning signal (or first positioning signal). In this case, the second UE may recognize that the request PRS and/or first positioning signal are correctly received by confirming that the response PRS has the same PRS pattern as that of the second positioning signal.

Alternatively, the second UE may identify which NACK condition (or NACK type) among the NACK conditions (or NACK types) is satisfied, based on the second positioning signal and/or response PRS. For example, depending on the NACK condition, the first UE may change the correlation between the first PRS pattern included in the second positioning signal and the second PRS pattern of the response PRS. That is, the first UE may determine the difference between the first and second PRS patterns differently depending on the NACK condition, and the second UE may calculate the correlation of the response PRS (with the second PRS pattern) in the correlator based on the first PRS pattern and then identify both the NACK and the NACK type. Alternatively, the first UE may transmit the response PRS by intentionally rotating the phase of the PRS in the PRS pattern by a latitude value depending on the NACK type, and the second UE may recognize the NACK type based on the phase rotation of the PRS.

In this case, as described above, the second UE may determine whether to change transmission parameters for the request PRS and first positioning signal to be retransmitted according to the NACK type. When the second UE changes the transmission parameters, the second UE may determine parameter(s) to change among the transmission parameters. For example, when the second UE recognizes a NACK due to the fourth NACK condition (or fourth NACK type), the second UE may retransmit the request PRS by increasing the bandwidth for the request PRS. In addition, the second UE may transmit the request PRS and/or first positioning signal to the first UE according to the aforementioned transmission parameter changing methods.

As described above, the second UE may obtain ACK/NACK information for the request PRS and/or information on the NACK type based on the PRS pattern of the response PRS. The second UE may retransmit the request PRS by maintaining or changing the transmission parameters based on the obtained information, In conclusion, the second UE may perform the above-described various P-ARQ operations (e.g., automatic request retransmissions for positioning systems, ARQ for sidelink RTT positioning and blind retransmission, etc.), receive ACK/NACK information related to the various P-ARQ operations in the response PRS, and then identify the ACK/NACK information.

Communication System Example to which the Present Disclosure is Applied

Although not limited thereto, various descriptions, functions, procedures, proposals, methods, and/or operational flow charts of the present disclosure disclosed in this document may be applied to various fields requiring wireless communication/connection (5G) between devices.

Hereinafter, it will be illustrated in more detail with reference to the drawings. In the following drawings/description, the same reference numerals may exemplify the same or corresponding hardware blocks, software blocks, or functional blocks, unless otherwise indicated.

Figure 13:
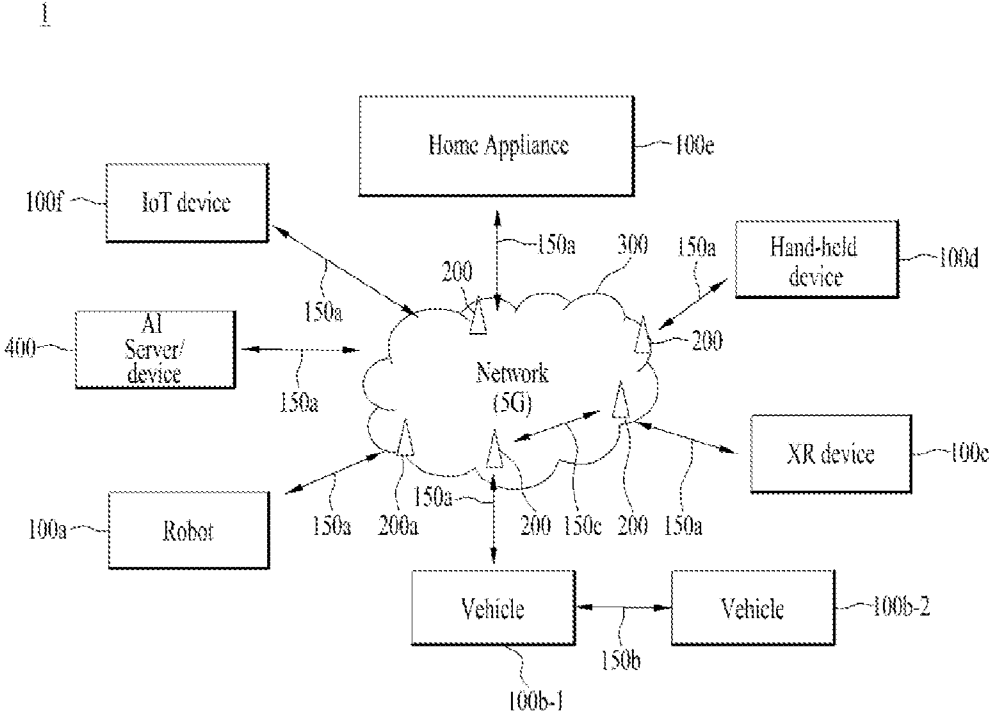
FIG. 13 illustrates a communication system applied to the present disclosure.

FIG. 13 illustrates a communication system applied to the present disclosure.

Referring to FIG. 13, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles **100*b*-1 and 100*b*-2 may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f***.

Wireless communication/connections **150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g., relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b*** may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices to which the Present Disclosure is Applied

Figure 14:
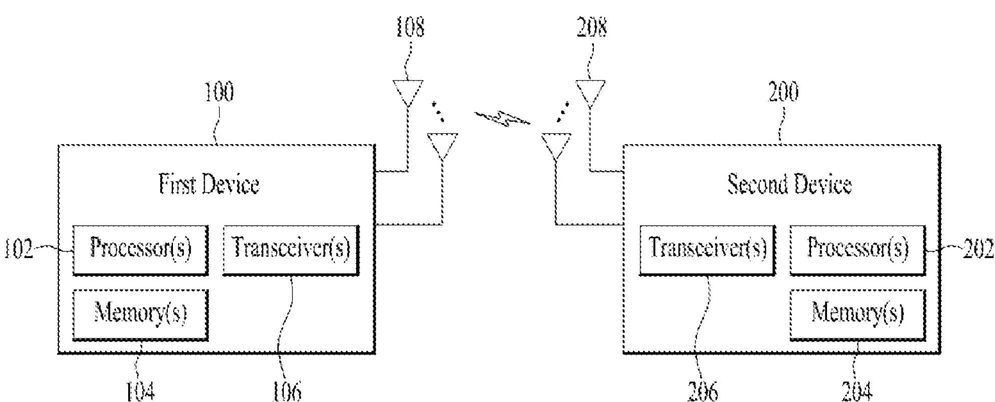
FIG. 14 illustrates wireless devices applicable to the present disclosure.

FIG. 14 illustrates a wireless device applicable to the present disclosure.

Referring to FIG. 14, a first wireless device 100 and a second wireless device 200 may transmit radio signals through a variety of RATs (e.g., LTE and NR). Herein, {the first wireless device 100 and the second wireless device 200} may correspond to {the wireless device **100*x* and the BS 200} and/or {the wireless device 100*x* and the wireless device 100*x*} of FIG. 13**.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information acquired by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

Specifically, a first UE may include the processor(s) 102 connected to the transceiver(s) 106 (or RF transceiver) and the memory(s) 104. The memory(s) 104 may include at least one program for performing operations related to the PRS-based P-ARQ procedure described above with reference to FIGS. 11 and 12.

The processor(s) may be configured to control the RF transceiver to: receive a first positioning signal including scheduling information on a request PRS; receive the request PRS requesting transmission of a response PRS based on the scheduling information; transmit a second positioning signal scheduling the response PRS; and transmit the response PRS. A PRS pattern of the response PRS may be determined based on an ACK/NACK for the request PRS.

Alternatively, a chipset including the processor(s) 102 and the memory(s) 104 may be configured. The chipset may include: at least one processor; and at least one memory operably connected to the at least one processor and configured to, when executed, cause the at least one processor to perform operations. The operations may include: receiving a first positioning signal including scheduling information on the request PRS; receiving the request PRS requesting transmission of a response PRS based on the scheduling information; transmitting a second positioning signal scheduling the response PRS; and transmitting the response PRS. A PRS pattern of the response PRS may be determined based on an ACK/NACK for the request PRS. In addition, the operations may include operations of transmitting the response PRS related to the ACK/NACK according to the embodiments described in FIGS. 11 and 12 based on the program included in the memory(s) 104.

Alternatively, there is provided a computer-readable storage medium including at least one computer program configured to cause at least one processor to perform operations. The operations may include: receiving a first positioning signal including scheduling information on the request PRS; receiving the request PRS requesting transmission of a response PRS based on the scheduling information; transmitting a second positioning signal scheduling the response PRS; and transmitting the response PRS. A PRS pattern of the response PRS may be determined based on an ACK/NACK for the request PRS. In addition, the operations may include operations of transmitting the response PRS related to the ACK/NACK according to the embodiments described in FIGS. 11 and 12 based on the program included in the memory(s) 104.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information acquired by processing the fourth information/signals in the memory(s)

204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

A second UE may include the transceiver(s) 206 or RF transceiver, the memory(s) 204, and/or the processor(s) 202.

The processor(s) 202 may be configured to control the RF transceiver to: transmit a first positioning signal including scheduling information on a request PRS; transmit the request PRS requesting transmission of a response PRS; receive a second positioning signal scheduling the response PRS; and receive the response PRS based on the second positioning signal. The second UE may be configured to obtain ACK/NACK information for the request PRS based on the second positioning signal and a PRS pattern of the response PRS. In addition, the operations may include operations of transmitting the response PRS related to the ACK/NACK according to the embodiments described in FIGS. 11 and 12 based on the program included in the memory(s) 204.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Wireless Devices to which the Present Disclosure is Applied

Figure 15:
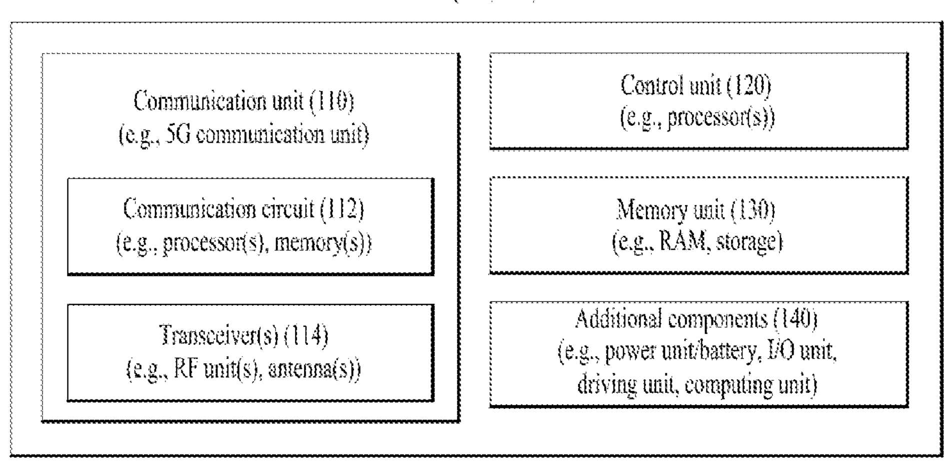
FIG. 15 illustrates another example of a wireless device to which the present disclosure is applied. The wireless device may be implemented in various forms according to use-examples/services.

FIG. 15 illustrates another example of a wireless device applied to the present disclosure. The wireless device may be implemented in various forms according to a use-case/service (refer to FIG. 13)

Referring to FIG. 15, wireless devices 100 and 200 may correspond to the wireless devices 100 and 200 of FIG. 14 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 14. For example, the transceiver(s) 114 may include the one or more transceivers 106 and 206 and/or the one or more antennas 108 and 208 of FIG. 14. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 13), the vehicles (100*b*-1 and 100*b*-2 of FIG. 13), the XR device (100*c* of FIG. 13), the hand-held device (100*d* of FIG. 13), the home appliance (100*e* of FIG. 13), the IoT device (100*f* of FIG. 13), a digital broadcast terminal, a hologram device, a public safety device, an MTC device, a medicine device, a fintech device (or a finance device), a security device, a climate/environment device, the AI server/device (400 of FIG. 13), the BSs (200 of FIG. 13), a network node, etc. The wireless device may be used in a mobile or fixed place according to a use-example/service.

In FIG. 15, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 16:
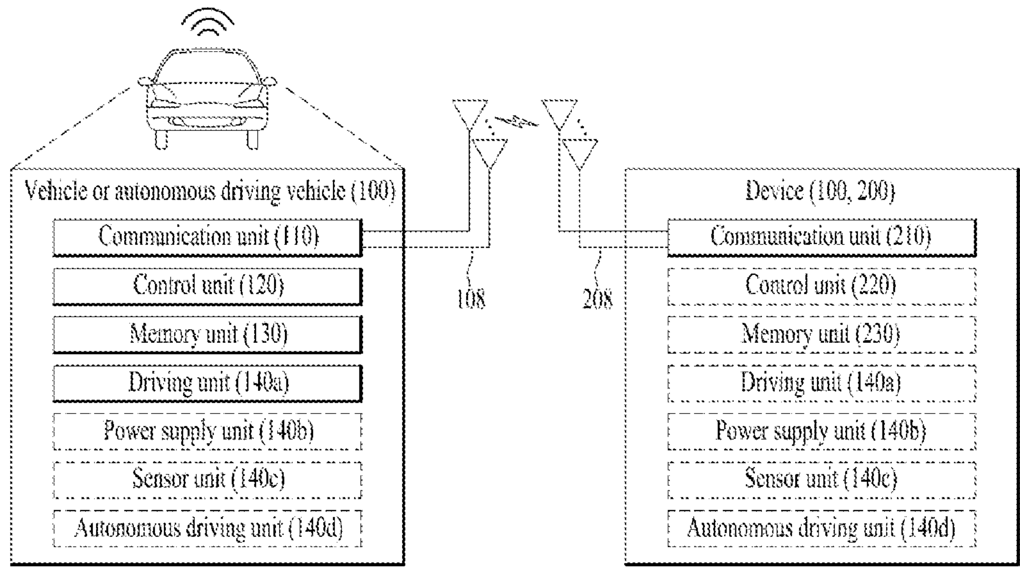
FIG. 16 illustrates a vehicle or an autonomous driving vehicle applied to the present disclosure.

Examples of Vehicles or Autonomous Vehicles to which the Present Disclosure is Applied FIG. 16 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 16, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 15, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). Also, the driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the acquired data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles.

In the middle of autonomous driving, the sensor unit 140*c* may obtain a vehicle state and/or surrounding environment information. The autonomous driving unit 140*d* may update the autonomous driving path and the driving plan based on the newly acquired data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Here, wireless communication technologies implemented in the wireless devices (XXX, YYY) of the present specification may include LTE, NR, and 6G, as well as Narrowband Internet of Things for low power communication. At this time, for example, the NB-IoT technology may be an example of a Low Power Wide Area Network (LPWAN) technology and may be implemented in standards such as LTE Cat NB1 and/or LTE Cat NB2, which is not limited to the above-described names. Additionally or alternatively, the wireless communication technology implemented in the wireless devices (XXX, YYY) of the present specification may perform communication based on LTE-M technology. In this case, as an example, the LTE-M technology may be an example of LPWAN technology and may be referred to by various names such as eMTC (enhanced machine type communication). For example, LTE-M technology may be implemented in at least one of a variety of standards, such as 1) LTE CAT 0, 2) LTE Cat M1, 3) LTE Cat M2, 4) LTE non-BL (non-Bandwidth Limited), LTE-MTC, 6) LTE Machine Type Communication, and/or 7) LTE M, and is not limited to the above-described names. Additionally or alternatively, the wireless communication technology implemented in the wireless devices (XXX, YYY) of the present specification is at least one of ZigBee, Bluetooth, and Low Power Wide Area Network (LPWAN) considering low power communication and is not limited to the above-described names. As an example, ZigBee technology can generate personal area networks (PANs) related to small/low-power digital communication based on various standards such as IEEE 802.15.4 and may be called various names.

The embodiments described above are those in which components and features of the present disclosure are combined in a predetermined form. Each component or feature should be considered optional unless explicitly stated otherwise. Each component or feature may be implemented in a form that is not combined with other components or features. In addition, it is also possible to constitute an embodiment of the present disclosure by combining some components and/or features. The order of operations described in the embodiments of the present disclosure may be changed. Some configurations or features of one embodiment may be included in other embodiments or may be replaced with corresponding configurations or features of other embodiments. It is obvious that the embodiments may be configured by combining claims that do not have an explicit citation relationship in the claims or may be included as new claims by amendment after filing.

In this document, embodiments of the present disclosure have been mainly described based on a signal transmission/reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network comprising a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS), and Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The above-described embodiments of the present disclosure are applicable to various mobile communication systems.

The invention claimed is:

1. A method by a first user equipment (UE) comprising:

receiving, from a second UE, a first physical inter-UE control channel including first inter-UE control information for a first positioning reference signal (PRS) for positioning related to inter-UE;

receiving, from the second UE, the first PRS based on the first inter-UE control information;

transmitting, to the second UE, a second physical inter-UE control channel including second inter-UE control information for a second PRS responding to a reception of the first PRS; and transmitting, to the second UE, the second PRS based on the second inter-UE control information, wherein acknowledgment (ACK) or negative-acknowledgment (NACK) information for the reception of the first PRS is provided to the second UE through a PRS pattern of the second PRS determined based on whether reception of the first PRS was successful.

2. The method of claim 1, wherein based on the NACK for the first PRS, the second PRS has a second PRS pattern obtained by inverting a first PRS pattern scheduled by the second physical inter-UE control channel in a frequency domain.

3. The method of claim 1, wherein based on the NACK for the first PRS, the second PRS has a second PRS pattern obtained by inverting a first PRS pattern scheduled by the second physical inter-UE control channel in a time domain.

4. The method of claim 1, wherein based on the ACK for the first PRS, the second PRS has a PRS pattern corresponding to a first PRS pattern scheduled by the second physical inter-UE control channel.

5. The method of claim 1, wherein based on that a plurality of reception timings are measured based on the first PRS, the second PRS has a PRS pattern corresponding to the NACK.

6. The method of claim 1, wherein based on that a difference between a first positioning quality indicator (PQI) for the second UE included in the first physical inter-UE control channel and a second PQI measured based on the first PRS is greater than or equal to a predetermined difference, the second PRS has a PRS pattern corresponding to the NACK.

7. The method of claim 1, wherein the first UE is configured to request the second UE to retransmit at least one of the first physical inter-UE control channel and the first PRS by transmitting the second PRS with a PRS pattern corresponding to the NACK.

8. A method by a second user equipment (UE) comprising:

transmitting, to a first UE, a first physical inter-UE control channel including first scheduling information for a first positioning reference signal (PRS) for positioning related to inter-UE;

transmitting, to the first UE, the first PRS based on the first inter-UE control information;

receiving, form the first UE, a second physical inter-UE control channel including second inter-UE control information for a second PRS responding to a reception of the first PRS; and receiving, form the first UE, the second PRS second PRS based on the second inter-UE control information, wherein acknowledgment (ACK) or negative-acknowledgment (NACK) information for the reception of the first PRS is provided to the second UE through a PRS pattern of the second PRS determined based on whether reception of the first PRS was successful.

9. The method of claim 8, wherein based on that the second PRS has a second PRS pattern different from a first PRS pattern included in the second physical inter-UE control channel, the second UE is configured to determine that the NACK information is included, and wherein the second PRS pattern corresponds to a PRS pattern obtained by inverting the first PRS pattern in a frequency domain.

10. A first user equipment (UE) comprising:

a radio frequency (RF) transceiver; and a processor connected to the RF transceiver, wherein the processor is configured to control the RF transceiver to:

receive, from a second UE, a first physical inter-UE control channel including first inter-UE control information for a first positioning reference signal (PRS) for positioning related to inter-UE;

receive, from the second UE, the first PRS based on the first inter-UE control information;

transmit, to the second UE, a second physical inter-UE control channel including second inter-UE control information for a second PRS responding to a reception of the first PRS; and transmit, to the second UE, the second PRS based on the second inter-UE control information, wherein acknowledgment (ACK) or negative-acknowledgment (NACK) information for the reception of the first PRS is provided to the second UE through a PRS pattern of the second PRS determined based on whether reception of the first PRS was successful.

* * * * *